United States Patent
Jin et al.

(10) Patent No.: US 12,281,394 B2
(45) Date of Patent: Apr. 22, 2025

(54) COPPER FOIL WITH ANTI-WRINKLE PROPERTY, ELECTRODE COMPRISING SAME, SECONDARY BATTERY COMPRISING SAME, AND MANUFACTURING METHOD THEREFOR

(71) Applicant: SK NEXILIS CO., LTD., Jeongeup-si (KR)

(72) Inventors: Shan Hua Jin, Jeongeup-si (KR); An Na Lee, Jeongeup-si (KR); Seung Min Kim, Jeongeup-si (KR)

(73) Assignee: SK NEXILIS CO., LTD., Jeongeup-si (KR)

( * ) Notice: Subject to any disclaimer, the term of this patent is extended or adjusted under 35 U.S.C. 154(b) by 578 days.

(21) Appl. No.: 17/614,859

(22) PCT Filed: Nov. 13, 2020

(86) PCT No.: PCT/KR2020/015966
§ 371 (c)(1),
(2) Date: Nov. 29, 2021

(87) PCT Pub. No.: WO2021/101177
PCT Pub. Date: May 27, 2021

(65) Prior Publication Data
US 2022/0228268 A1     Jul. 21, 2022

(30) Foreign Application Priority Data
Nov. 21, 2019     (KR) .................. 10-2019-0150119

(51) Int. Cl.
C23C 28/00     (2006.01)
H01M 4/04     (2006.01)
(Continued)

(52) U.S. Cl.
CPC .......... *C23C 28/322* (2013.01); *C23C 28/321* (2013.01); *H01M 4/0407* (2013.01);
(Continued)

(58) Field of Classification Search
CPC ..... C23C 28/322; C23C 28/321; C23C 28/02; C23C 28/023; C23C 28/32; C23C 28/34;
(Continued)

(56) References Cited

U.S. PATENT DOCUMENTS

| | | | | |
|---|---|---|---|---|
| 2010/0104951 A1* | 4/2010 | Iwama | .................. | H01M 4/133 429/188 |
| 2015/0030873 A1* | 1/2015 | Cheng | ...................... | C25D 3/38 428/606 |

(Continued)

FOREIGN PATENT DOCUMENTS

| | | | | |
|---|---|---|---|---|
| CN | 108306022 A | | 7/2018 | |
| JP | 2016050325 | * | 4/2016 | ............. B32B 15/08 |

(Continued)

OTHER PUBLICATIONS

English Translation of JP2016050325.*
(Continued)

*Primary Examiner* — Kiran Quraishi Akhtar
(74) *Attorney, Agent, or Firm* — K&L Gates LLP

(57) ABSTRACT

Provided in one embodiment of the present disclosure is a copper foil, which comprises a copper layer having a matte surface and a shiny surface, and an anticorrosive film arranged on the copper layer, and has a residual stress of 0.5-25 MPa on the basis of the absolute value thereof, wherein the copper layer comprises copper and carbon (C), the amount of carbon (C) in the copper layer is 2-20 ppm, the copper layer has a plane (111), a plane (200), a plane (220) and a plane (311) including crystalline particles, the ratio of the diffraction intensity of the plane (220) to the sum (Continued)

of the diffraction intensities of the plane (111), the plane (200), the plane (220) and the plane (311) is 10-40%, and the crystalline particles of the plane (220) have an average particle size of 70-120 nm at room temperature.

10 Claims, 9 Drawing Sheets

(51) Int. Cl.
    *H01M 4/66*         (2006.01)
    *H01M 10/052*     (2010.01)
    *H01M 10/0567*    (2010.01)
    *H01M 10/0568*    (2010.01)
    *H01M 10/0569*    (2010.01)

(52) U.S. Cl.
    CPC ......... *H01M 4/661* (2013.01); *H01M 10/052* (2013.01); *H01M 10/0567* (2013.01); *H01M 10/0568* (2013.01); *H01M 10/0569* (2013.01); *H01M 2300/0028* (2013.01)

(58) Field of Classification Search
    CPC ....... C23C 28/345; C23C 22/24; C23C 28/30; C23C 28/341; C23C 30/00; C25D 1/04; C25D 3/38; C25D 5/48; H01M 4/0407; H01M 4/661; H01M 4/663; H01M 4/667; H01M 10/052; H01M 10/0567; H01M 10/0568; H01M 10/0569; H01M 10/0525; H01M 2300/0028; Y02E 60/10
See application file for complete search history.

(56) References Cited

U.S. PATENT DOCUMENTS

| | | | |
|---|---|---|---|
| 2018/0062199 A1* | 3/2018 | Kim | ................. H01M 10/0562 |
| 2019/0249322 A1 | 8/2019 | Lee et al. | |
| 2020/0181790 A1* | 6/2020 | Jin | ........................... C25D 1/04 |

FOREIGN PATENT DOCUMENTS

| | | | | |
|---|---|---|---|---|
| KR | 20150041577 A | | 4/2015 | |
| KR | 20150068386 A | | 6/2015 | |
| KR | 20160021174 A | | 2/2016 | |
| KR | 20190009048 A | | 1/2019 | |
| KR | 20190012922 | * | 2/2019 | ............... C25D 1/04 |
| KR | 20190012922 A | | 2/2019 | |
| KR | 20190025418 A | | 3/2019 | |
| KR | 20190074107 A | | 6/2019 | |
| TW | 201807875 A | | 3/2018 | |

OTHER PUBLICATIONS

International Search Report for related International Application No. PCT/KR2020/015966; report dated May 27, 2021; (5 pages).
Written Opinion for related International Application No. PCT/KR2020/015966; report dated May 27, 2021; (4 pages).
Office Action for related Chinese Application No. 202080041738.6; action dated Jan. 6, 2024; (6 pages).
Office Action for related Taiwan Application No. 109140798; report dated Jan. 6, 2022; (7 pages).
Office Action for related Korean Application No. 10-2019-0150119; action dated Feb. 17, 2025; (7 pages).

* cited by examiner

105

COPPER FOIL WITH ANTI-WRINKLE PROPERTY, ELECTRODE COMPRISING SAME, SECONDARY BATTERY COMPRISING SAME, AND MANUFACTURING METHOD THEREFOR

CROSS-REFERENCE TO RELATED APPLICATIONS

The present application is a National Stage of International Application No. PCT/KR2020/015966 filed on Nov. 13, 2020, which claims the benefit of Korean Patent Application No. 10-2019-0150119, filed on Nov. 21, 2019, with the Korean Intellectual Property Office, the entire contents of each hereby incorporated by reference.

FIELD

The present disclosure relates to a copper foil which is prevented from being wrinkled or curled, an electrode including the copper foil, a secondary battery including the electrode, and a method of manufacturing the copper foil.

BACKGROUND

A secondary battery is a type of energy converter that converts electrical energy into chemical energy, stores the chemical energy, and generates electricity by converting the chemical energy into electrical energy when the electricity is needed. Secondary batteries are rechargeable and thus are also referred to as rechargeable batteries.

Among the secondary batteries, lithium secondary batteries have a high operating voltage, high energy density, and excellent lifetime characteristics. In recent years, as the use of portable electronic devices such as smartphones and notebook computers has increased, and as electric vehicles are commercialized, the demand for lithium secondary batteries is rapidly increasing. Such a secondary battery includes an anode current collector made of a copper foil. Among copper foils, an electrolytic copper foil is widely used as an anode current collector of a secondary battery. Along with an increase in demand for secondary batteries, there is an increase in demand for secondary batteries with high capacity, high efficiency, and high quality, and thus, there is a need for copper foils capable of improving characteristics of secondary batteries. In particular, there is a need for copper foils that can impart high capacity to secondary batteries and enable secondary batteries to stably maintain capacity.

Meanwhile, as copper foils become thinner, an amount of active materials that may be included in a constant space may be increased, and the number of current collectors may be increased. Thus, the capacity of secondary batteries may be increased. However, as copper foils become thinner, curling occurs, and thus, when the copper foil is wound, defects such as tears or wrinkles of the copper foil occur due to a curling of an edge. For this reason, there is difficulty in manufacturing very thin film-type copper foils. Therefore, in order to manufacture a copper foil having a very thin thickness, the curling of the copper foil should be prevented.

Meanwhile, an electrolytic copper foil used as an anode current collector has a tensile strength of about 30 kgf/mm$^2$ to 40 kgf/mm$^2$. In order to manufacture a high capacity lithium secondary battery, a metal or composite-based active material having high capacity characteristics has recently been in the spotlight. Since the metal or composite-based active material has severe volume expansion during a charging/discharging process, a copper foil should be able to cope with the volume expansion of the active material.

When these points are taken into consideration, not only in a manufacturing process of a copper foil, but also in a manufacturing process of an electrode for a secondary battery or a secondary battery using the copper foil, curling, tears, or wrinkles should not occur in the copper foil. In particular, in a rolling process or a coating process of active materials in a manufacturing process of a copper foil or a secondary battery using the copper foil through a roll-to-roll (RTR) process, defects, in which the copper foil is torn, should not occur.

SUMMARY

The present disclosure relates to a copper foil capable of satisfying such requirements, an electrode including the copper foil, a secondary battery including the electrode, and a method of manufacturing the copper foil.

The present disclosure is directed to providing a copper foil which is not curled, wrinkled, or torn in a manufacturing process even while being thin. The present disclosure is also directed to providing a copper foil which is not curled, wrinkled, or torn in a manufacturing process of an electrode for a secondary battery or a secondary battery using the copper foil.

The present disclosure is also directed to providing an electrode for a secondary battery including such a copper foil and a secondary battery including the electrode for a secondary battery.

The present disclosure is also directed to providing a method of manufacturing a copper foil in which curling, wrinkles, or tears are prevented.

Apart from the aspects of the present disclosure mentioned above, other features and advantages of the present disclosure will be described below and would be clearly understood from the description by those skilled in the art.

One embodiment of the present disclosure is directed to controlling the crystal orientation of a copper layer constituting a copper foil to control a curling phenomenon of the copper foil. One embodiment of the present disclosure is also directed to reducing residual stress inside the copper foil to suppress the occurrence of curling in the copper foil as much as possible.

According to one embodiment of the present disclosure, a copper foil includes a copper layer having a matte surface and a shiny surface, and an anticorrosive film disposed on the copper layer, wherein the copper foil has a residual stress of 0.5 MPa to 25 MPa based on an absolute value, the copper layer includes copper and carbon (C), in the copper layer, a content of the carbon (C) is in a range of 2 ppm to 20 ppm, the copper layer has a (111) face, a (200) face, a (220) face, and a (311) face including crystalline particles, a ratio of diffraction intensity of the (220) face to the sum of diffraction intensities of the (111) face, the (200) face, the (220) face, and the (311) face is in a range of 10% to 40%, and the crystalline particles on the (220) face have an average particle size of 70 nm to 120 nm at room temperature.

The residual stress may be measured on at least one of the (111) face, the (200) face, the (220) face, and the (311) face.

The residual stress may be measured on the (200) face.

The copper foil may have an elongation of 2% to 20% after being heat-treated at a temperature of 130° C. for 30 minutes.

The copper foil may have a first surface in a direction of the matte surface and a second surface in a direction of the shiny surface, and a difference in arithmetic mean roughness (Ra) between the first surface and the second surface may be 0.5 μm or less.

The copper foil may have a first surface in a direction of the matte surface and a second surface in a direction of the shiny surface, and a difference in ten-point mean roughness (Rz JIS) between the first surface and the second surface may be 0.5 μm or less.

The copper foil may have a thickness of 2 μm to 20 μm.

The anticorrosive film may include at least one selected from among chromium, a silane compound, and a nitrogen compound.

According to another embodiment of the present disclosure, an electrode for a secondary battery includes the copper foil, and an active material layer disposed on at least one surface of the copper foil.

According to still another embodiment of the present disclosure, a secondary battery includes a cathode, an anode disposed opposite to the cathode, an electrolyte which provides an environment in which lithium ions are movable between the cathode and the anode, and a separator configured to electrically insulate the cathode from the anode, wherein the anode includes the copper foil and an active material layer disposed on the copper foil.

According to yet another embodiment of the present disclosure, a method of manufacturing a copper foil includes preparing an electrolyte including copper ions and forming a copper layer by applying a current at a current density of 30 to 70 ASD (A/dm$^2$) to a cathode plate and a rotating anode drum disposed to be spaced apart from each other in the electrolyte, wherein the electrolyte includes the copper ions at a concentration of 70 g/L to 100 g/L, a sulfuric acid at a concentration of 70 g/L to 150 g/L, chlorine (Cl) at a concentration of 1 ppm to 45 ppm, arsenic (As) ions at a concentration of 0.6 g/L or less, and an organic additive, the organic additive includes at least one of a polishing agent (component A), a moderator (component B), a leveling agent (component C), and a roughness regulator (component D), the polishing agent (component A) includes a sulfonic acid or a metal salt thereof, the moderator (component B) includes a nonionic water-soluble polymer, the leveling agent (component C) includes at least one of nitrogen (N) and sulfur (S), and the roughness regulator (component D) includes a nitrogen-containing heterocyclic quaternary ammonium salt or a derivative thereof.

The general description of the present disclosure as described above is merely intended to illustrate or explain the present disclosure and does not limit the scope of the present disclosure.

According to one embodiment of the present disclosure, the crystal orientation of a copper layer constituting a copper foil is controlled, the residual stress inside the copper foil is reduced, and the curling of the copper foil is reduced. Accordingly, the occurrences of curling, wrinkles, or tears are prevented in a manufacturing process of the copper foil. In addition, when the copper foil is used, curling, wrinkles, or tears of the copper foil are prevented in a manufacturing process of an electrode for a secondary battery or a secondary battery.

BRIEF DESCRIPTION OF THE DRAWINGS

The accompanying drawings, which are included to provide a further understanding of the present disclosure and are incorporated in and constitute a part of this application, illustrate embodiments of the present disclosure and serve to explain the principle of the disclosure together with the description.

DETAILED DESCRIPTION

Figure 1:
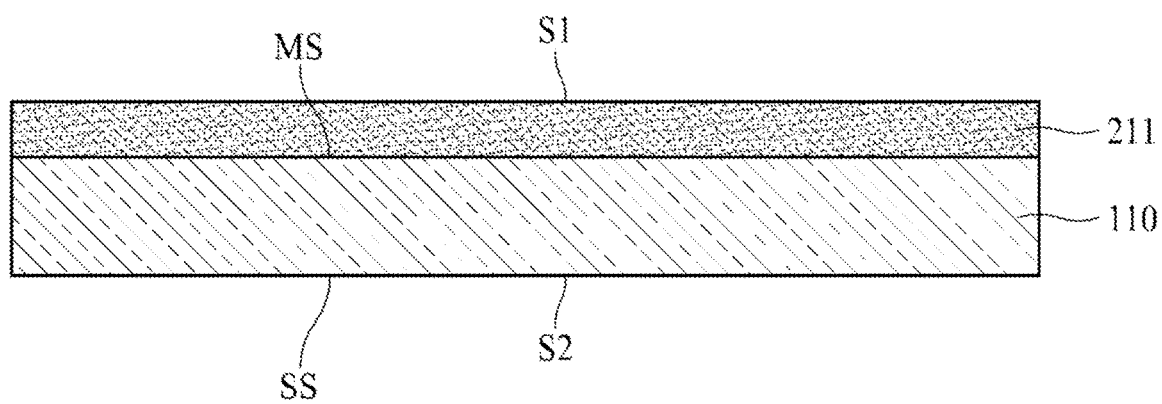
FIG. 1 is a schematic cross-sectional view of a copper foil according to one embodiment of the present disclosure.

Hereinafter, embodiments of the present disclosure will be described in detail with reference to the accompanying drawings.

It will be apparent to those skilled in the art that various modifications and variations can be made in the present disclosure without departing from the spirit and scope of the present disclosure. Thus, it is intended that the present disclosure covers the modifications and variations of this disclosure provided they come within the scope of the appended claims and their equivalents.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification.

The terms such as "including," "having," and "consist of" used herein are generally intended to allow other components to be added unless the terms are used with the term "only." Any references to singular may include plural unless expressly stated otherwise. Components are interpreted to include an ordinary error range even if not expressly stated.

When the position relation between two portions is described using the terms such as "on," "above," "below," and "next," one or more portions may be positioned between the two positions unless the term "immediately" or "directly" is used.

When the description of the time sequential relation includes "after," "followed by," "next," "before," etc., non-continuous cases may be included unless "right" or "direct" is used.

Terms such as first, second, etc. may be used to describe various components, but these components are not limited by these terms. These terms are only used to distinguish one element from the other components. Thus, the first component referred to below may be a second component within the scope of the present disclosure.

The term "at least one" should be understood to include any combination possible from one or more related items.

Features of various embodiments of the present disclosure may be partially or overall coupled to or combined with each other and may be variously inter-operated with each other and driven technically. The embodiments of the present disclosure may be carried out independently from each other or may be carried out together in a co-dependent relationship.

FIG. 1 is a schematic cross-sectional view of a copper foil 101 according to one embodiment of the present disclosure.

The copper foil 101 according to one embodiment of the present disclosure includes a copper layer 110. The copper layer 110 has a matte surface MS and a shiny surface SS opposite to the matte surface MS.

Figure 9:
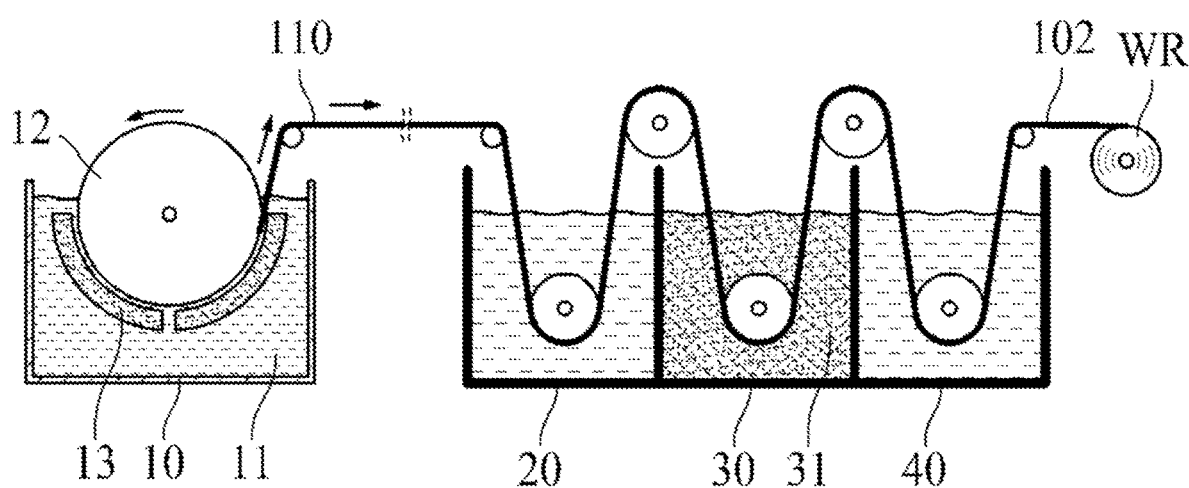
FIG. 9 is a schematic view of a manufacturing process of the copper foil shown in FIG. 5.

For example, the copper layer 110 may be formed on a rotating anode drum through electroplating (see FIG. 9). In this case, the shiny surface SS refers to a surface in contact with the rotating anode drum in an electroplating process, and the matte surface MS refers to a surface opposite to the shiny surface SS.

In general, the shiny surface SS has surface roughness lower than that of the matte surface MS. However, one embodiment of the present disclosure is not limited thereto, and the surface roughness of the shiny surface SS may be higher than or equal to the surface roughness of the matte surface MS. For example, according to a polishing degree of a rotating anode drum 12 (see FIG. 9) used for manufacturing the copper layer 110, the ten-point mean roughness of the shiny surface SS may be lower or higher than ten-point mean roughness (Rz JIS) of the matte surface MS. A surface of the rotating anode drum 12 may be polished using a polishing brush having a grit of #800 to #3000.

Referring to FIG. 1, the copper foil 101 includes an anticorrosive film 211 disposed on the copper layer 110. The anticorrosive film 211 may be omitted.

The anticorrosive film 211 may be disposed on at least one of the matte surface MS and the shiny surface SS of the copper layer 110. Referring to FIG. 1, the anticorrosive film 211 is disposed on the matte surface MS. However, one embodiment of the present disclosure is not limited thereto, and the anticorrosive film 211 may be disposed only on the shiny surface SS or may be disposed on both the matte surface MS and the shiny surface SS.

The anticorrosive film 211 may protect the copper layer 110 to prevent the copper layer 110 from being oxidized or degraded during storage or distribution. Therefore, the anticorrosive film 211 is also referred to as a protective layer.

According to one embodiment of the present disclosure, the anticorrosive film 211 may include at least one selected from among chromium (Cr), a silane compound, and a nitrogen compound.

For example, the anticorrosive film 211 may be made of an anticorrosive liquid including chromium (Cr), that is, an anticorrosive liquid including a chromic acid compound.

According to one embodiment of the present disclosure, with respect to the copper layer 110, the copper foil 101 has a first surface S1 that is a surface in the direction of the matte surface MS and a second surface S2 that is a surface in the direction of the shiny surface SS. Referring to FIG. 1, the first surface S1 of the copper foil 101 is a surface of the anticorrosive film 211, and the second surface S2 is the shiny surface SS. According to one embodiment of the present disclosure, the anticorrosive film 211 may be omitted, and when the anticorrosive film 211 is omitted, the matte surface MS of the copper layer 110 becomes the first surface S1 of the copper foil 101.

The copper layer 110 includes copper (Cu) and carbon (C) as a non-copper element. The non-copper element may be a component other than copper included in the copper layer 110 and thus may also be referred to as an impurity. Carbon (C) is derived from various organic additives, decomposition products of organic additives, and organic impurities.

A content of carbon (C) is in a range of 2 ppm to 20 ppm in the copper layer 110. When the content of carbon (C) is less than 2 ppm, a tendency for crystal grains to coarsen is decreased, and a curling phenomenon is increased. On the other hand, when the content of carbon (C) exceeds 20 ppm, since organic additives including carbon (C) are used in excess, defects in the copper foil are increased due to excessive impurities, and residual stress is increased due to non-uniform internal energy. Accordingly, the tensile strength, elongation, and electrical conductivity of the copper layer 110 may be reduced.

The content of carbon (c) included in the copper layer 110 of the copper foil 101 may be measured through Auger electron spectroscopy (AES).

Figure 2:
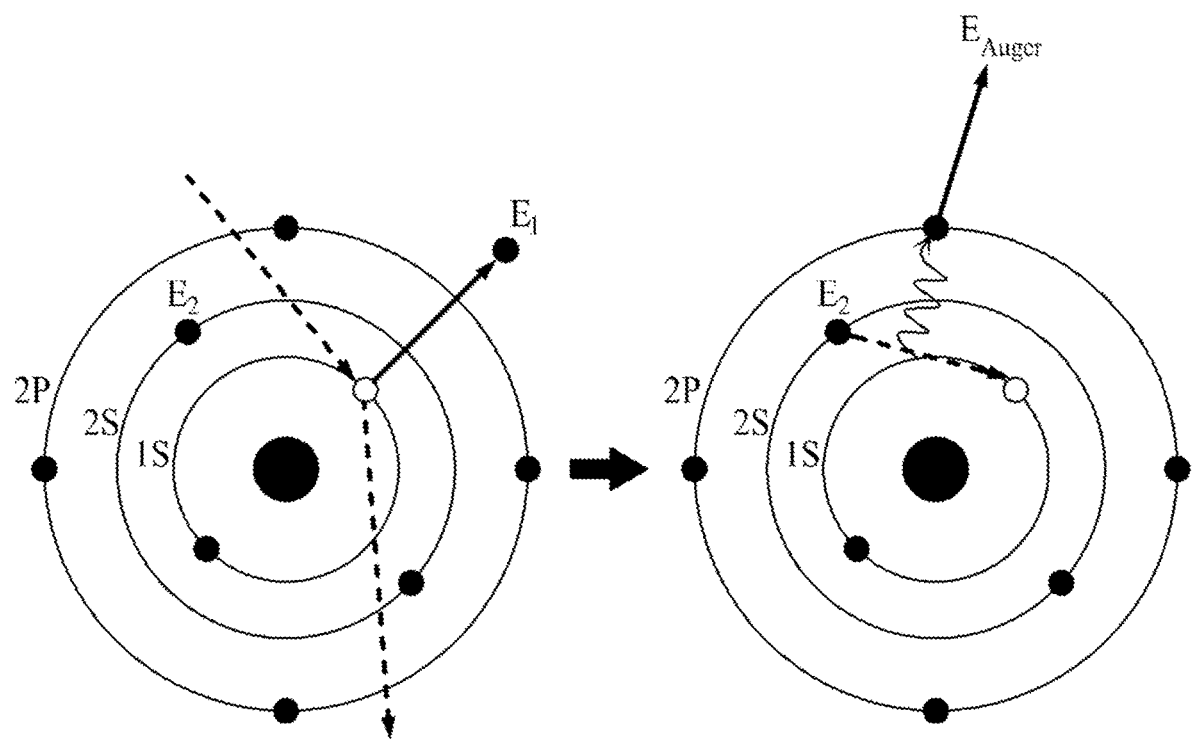
FIG. 2 shows schematic views for illustrating the generation of Auger electrons.

FIG. 2 shows schematic views for illustrating the generation of Auger electrons.

An Auger effect refers to a physical phenomenon in which, due to an electron emitted from an atom or ion, another electron is emitted. Such a second emitted electron generated in this case is referred to as an Auger electron.

When one electron E1 is removed from an inner level is of an atom to leave a vacancy, one electron E2 at a high level 2s fills the vacancy, and thus, energy corresponding to a difference between the high level 2s and a level of the vacancy is generated. The energy generated as above is released in the form of a photon or is used to additionally emit a second electron.

A phenomenon, in which the energy released as above is used for second emission and the second electron is emitted to an outside of the atom, is an Auger effect, and in this case, the emitted electron is referred to as an Auger electron.

According to one embodiment of the present disclosure, Auger electrons, which are emitted when a sample is etched by sputtering an argon (Ar) ion beam onto the sample, are analyzed through AES to detect a content of atoms.

Specifically, the copper foil 101 may be cut to manufacture a measurement sample having a size of 2 cm×2 cm, and the number of atoms may be measured from a surface of the sample using PHI700 (manufactured by ULVAC-PHI, INC.), which is a device for AES. Analysis conditions are as follows.

Electron energy analyzer: cylindrical mirror analyzer (CMA)
Electron beam energy: 5 KeV
Target current: 10 nA
Tilt: 30 degrees
Sputtering etching rate: 133 Å/min based on $SiO_2$ (3 KV argon ion beam)

According to one embodiment of the present disclosure, the copper layer 110 has crystal faces, and a ratio of diffraction intensity of a (220) face to the sum of diffraction intensities of (111), (200), (220), and (311) faces, which are the crystal faces of the copper layer 110, is in a range of 10% to 40%.

More specifically, the copper layer 110 may have the plurality of crystal faces, and the crystal face may be expressed using a Miller Index. Specifically, the crystal face of the copper layer 110 may be expressed as an (hkl) face. Each of the crystal faces has diffraction intensity, and the diffraction intensities of the crystal faces may be measured or calculated using X-ray diffraction (XRD).

Hereinafter, a method of measuring and calculating the diffraction intensities of the crystal faces of the copper layer 110 constituting the copper foil 101 will be described with reference to FIG. 3.

Figure 3:
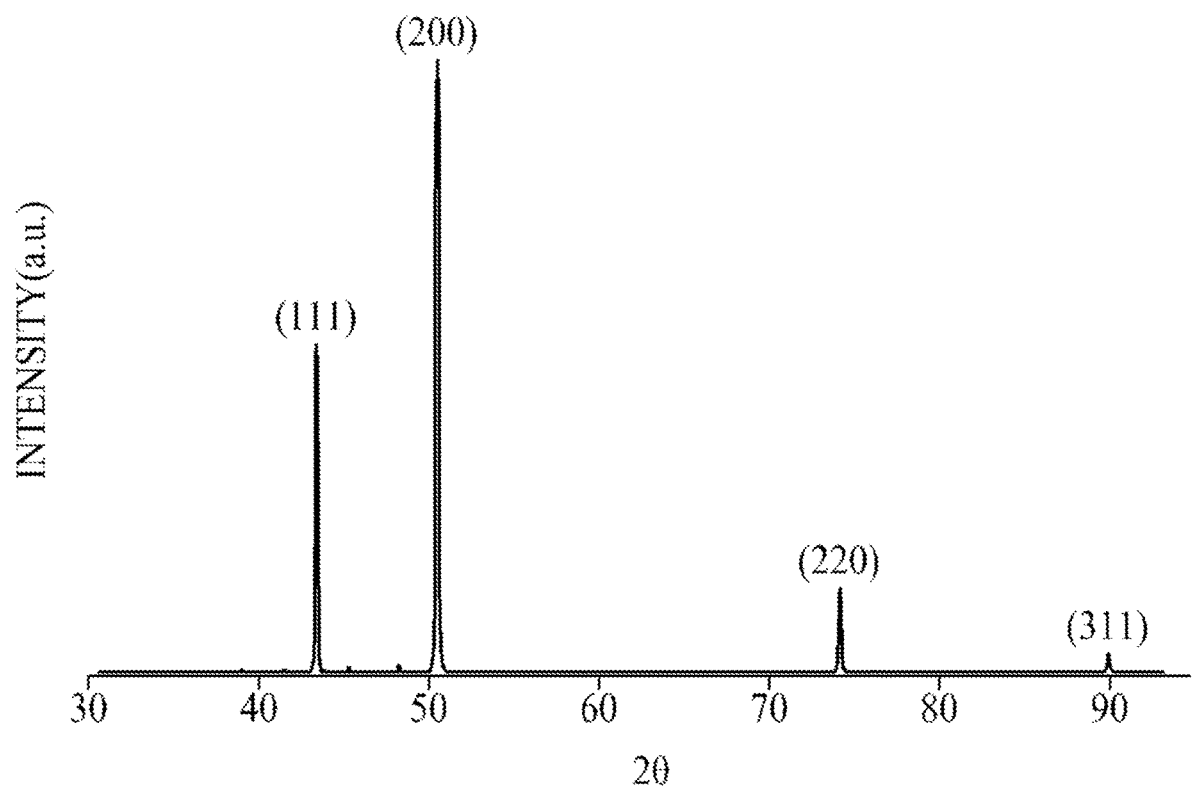
FIG. 3 shows an example of an X-ray diffraction (XRD) graph of a copper foil.

FIG. 3 shows an example of an XRD graph of a copper foil. More specifically, FIG. 3 shows an XRD graph of the copper layer 110 constituting the copper foil 101. Each peak of FIG. 3 corresponds to a crystal face.

First, in order to measure diffraction intensity, an XRD graph having peaks corresponding to n crystal faces is obtained at a diffraction angle (2θ) ranging from 30° to 90° through an XRD method [target: copper K alpha 1, 2θ interval: 0.01°, and 2θ scan speed: 3°/min]. Referring to FIG. 3, an XRD graph, which includes four peaks corresponding to the (111) face, the (200) face, the (220) face, and the (311) face, is obtained from the copper layer 110. In this case, n is four.

Next, XRD diffraction intensity [I(hkl)] of each crystal face (hkl) is obtained from the graph.

According to one embodiment of the present disclosure, the ratio of the diffraction intensity of the (220) face to the sum of the diffraction intensities of the (111), (200), (220), and (311) faces, which are the crystal faces of the copper layer 110, (that is, the ratio of diffraction intensity of (200) face) is obtained according to Equation 1 below.

$$\text{ratio of diffraction intensity of } (hkl) \text{ face} = \quad [\text{Equation 1}]$$
$$100 \times I(hkl)/[I(111) + I(200) + I(220) + I(311)]$$

When the ratio of the diffraction intensity of the (220) face to the sum of the diffraction intensities of the (111), (200), (220), and (311) faces is less than 10%, the growth of the (111) face and the (200) face in the copper layer 110 may be relatively facilitated to allow the (111) face and the (200) face to be oriented first, thereby causing a crystalline structure of the copper layer 110 to be excessively fine and thereby also increasing the inclusion of impurities. As a result, residual stress of the copper foil 101 may be increased to increase the occurrence of curling of the copper foil 101.

When the ratio of the diffraction intensity of the (220) face to the sum of the diffraction intensities of the (111), (200), (220), and (311) faces exceeds 40%, the growth of the (111) face and the (200) face in the copper layer 110 is relatively hindered, a fine crystalline structure of the copper layer 110 is reduced, and thus, the strength of the copper foil 101 is decreased.

Thus, according to one embodiment of the present disclosure, in the crystalline structure of the copper layer 110, the ratio of the diffraction intensity of the (220) face to the sum of the diffraction intensities of the (111), (200), (220), and (311) faces is adjusted in a range of 10% to 40%.

As described above, according to one embodiment of the present disclosure, the crystal orientation of the copper layer 110 can be controlled to prevent curling of the copper foil 101, thereby preventing wrinkles from occurring in the copper foil 101.

According to one embodiment of the present disclosure, the copper layer 110 of the copper foil 101 has crystallinity, and each crystal face (hkl) of the copper layer 110 includes crystalline particles. In other words, the copper layer 110 may include the crystalline particles, and the physical and mechanical properties of the copper foil 101 including the copper layer 110 may be changed according to the crystallinity of the copper layer 110.

In one embodiment of the present disclosure, when the crystalline particles have a specific polyhedral shape or even when the crystalline particles do not have a specific polyhedral shape, the crystalline particles may include all particles in which an X-ray diffraction phenomenon can be confirmed due to a crystal lattice formed of a periodic arrangement of atoms.

The crystalline particles included in the copper layer 110 have an average particle size of 70 nm to 120 nm. More specifically, the crystalline particles have an average particle size of 70 nm to 120 nm throughout a cross section of the copper layer 110 taken in a thickness direction of the copper layer 110.

The average particle size of the crystalline particles included in the copper layer 110 may be measured or calculated using the above-described XRD method. The average particle size of the crystalline particles may be calculated by applying a half-width of an XRD peak value of each crystal face.

When a relationship between two physical quantities is expressed as a graph and a shape of the graph forms a peak, the half-width refers to a width of a horizontal axis at a point at which a value of the peak along a vertical axis is half the maximum value of the peak.

When the crystalline particles included in the copper layer 110 are fine and the average particle size thereof is small, the copper foil 101 may have high strength. Regarding the average particle size of the crystalline particles, a nitrogen (N) or sulfur (S) component derived from an organic additive added to an electrolyte is incorporated into a grain structure of the copper layer 110, and thus, even after heat treatment, the nitrogen (N) or sulfur (S) component exhibits a pin effect of preventing an increase in average particle size of the crystalline particles included in the copper layer 110.

For example, when the copper layer 110 is manufactured through electroplating using an electrolyte and when at least one of chain type or ring type organic materials including at least one of nitrogen (N) and sulfur (S) is added to the electrolyte, elements of the organic material are incorporated into the copper layer 110. As described above, the incorporated elements become non-copper components of the copper layer 110, that is, impurities. The non-copper components allow a copper component to be finely electrodeposited in a process of forming the copper layer 110 through electroplating, thereby allowing the copper layer 110 and the copper foil 101 made of small crystal grains to be formed. The copper foil 101 may have high strength characteristics.

When the average particle size of the crystalline particles included in the copper layer 110 is less than 70 nm at room temperature, the growth of the (111) face and the (200) face is relatively facilitated to allow the (111) face and the (200) face to be oriented first, thereby causing the crystalline structure of the copper layer 110 to be excessively fine and thereby also increasing the inclusion of impurities. As a result, the residual stress of the copper foil 101 may be increased to increase the occurrence of curling of the copper foil 101. On the other hand, when the average particle size of the crystalline particles included in the copper layer 110 exceeds 120 nm, a fine crystalline structure of the copper layer 110 is reduced, and the high strength of the copper foil 101 is difficult to implement.

According to one exemplary embodiment of the present disclosure, the copper foil 101 has a residual stress of 0.5 MPa to 25 MPa based on an absolute value.

Residual stress is stress that remains inside an object even though no external force is applied to the object. Residual stress may be stress generated in a processed or heat-treated object and may remain in the form of tensile stress or compressive stress in the object according to a processing history of the object. The residual stress may cause the object to be broken or damaged.

When the copper foil 101 has great residual stress based on an absolute value, curling of the copper foil becomes severe. Since a curling phenomenon occurs severely in thin film-type copper foils, it is particularly important to control the curling phenomenon when the thin film-type copper foils are manufactured.

According to one embodiment of the present disclosure, curling of the copper foil is prevented by adjusting the residual stress of the copper foil.

Specifically, residual stress having a positive value indicates the presence of tensile stress in the copper foil 101, and residual stress having a negative value indicates the presence of compressive stress in the copper foil 101. According to a composition of an organic additive used in a manufacturing process of the copper foil 101, the copper foil may have residual stress in the form of tensile stress or compressive stress.

When the residual stress of the copper foil 101 is less than 0.5 MPa, the surface of the copper foil 101 may be coarsened due to non-uniformity of a crystal cross-sectional surface in an electroplating process for forming the copper layer 110. In this case, in a manufacturing process of an electrode for a secondary battery using the copper foil 101, the surface of the copper foil 101 may not be uniformly coated with an active material, and a charge/discharge capacity retention rate or stability of a secondary battery may be lowered.

Due to the partial incorporation of hydrogen or the self-growth of crystal grains in a plating process for manufacturing the copper layer 110 constituting the copper foil 101, the copper foil 101 may have a residual stress of 0.5 MPa or more based on an absolute value. When the absolute value of the residual stress of the copper foil 101 exceeds 25 MPa, in a manufacturing process of a secondary battery, curling, wrinkles, or the like may occur in the copper foil 101, thereby resulting in a decrease in workability and an increase in defect rate of the secondary battery.

Therefore, according to one embodiment of the present disclosure, the residual stress of the copper foil 101 is allowed to be in a range of 0.5 MPa to 25 MPa based on an absolute value. To this end, the crystal orientation of the copper layer 110 may be adjusted. That is, according to one embodiment of the present disclosure, the ratio of the diffraction intensity of the (220) face to the sum of the diffraction intensities of the (111), (200), (220), and (311) faces is adjusted in a range of 10% to 40% to allow the residual stress of the copper foil 101 to be in a range of 0.5 MPa to 25 MPa based on an absolute value.

The residual stress of the copper foil 101 may be measured on at least one of the crystal faces of the copper layer 110. That is, residual stress measured on at least one of the crystal faces of the copper layer 110 may be the residual stress of the copper foil 101. For example, the residual stress of the copper foil 101 may be measured on at least one face of the (111) face, the (200) face, the (220) face, and the (311) face of the crystal faces of the copper layer 110. That is, residual stress measured on at least one face of the (111) face, the (200) face, the (220) face, and the (311) face may be the residual stress of the copper foil 101.

According to one embodiment of the present disclosure, the residual stress of the copper foil 101 may be measured using an XRD residual stress measurement device. More specifically, the residual stress of each of the crystal faces of the copper layer 110 may be measured using a residual stress measurement device using XRD of the crystal faces of the copper layer 110.

For example, the residual stress of the copper foil 101 may be measured using D8 DISCOVER™ manufactured by Bruker company, which is an XRD residual stress measurement device. In this case, XRD analysis conditions may be set as follows.

Figure 4:
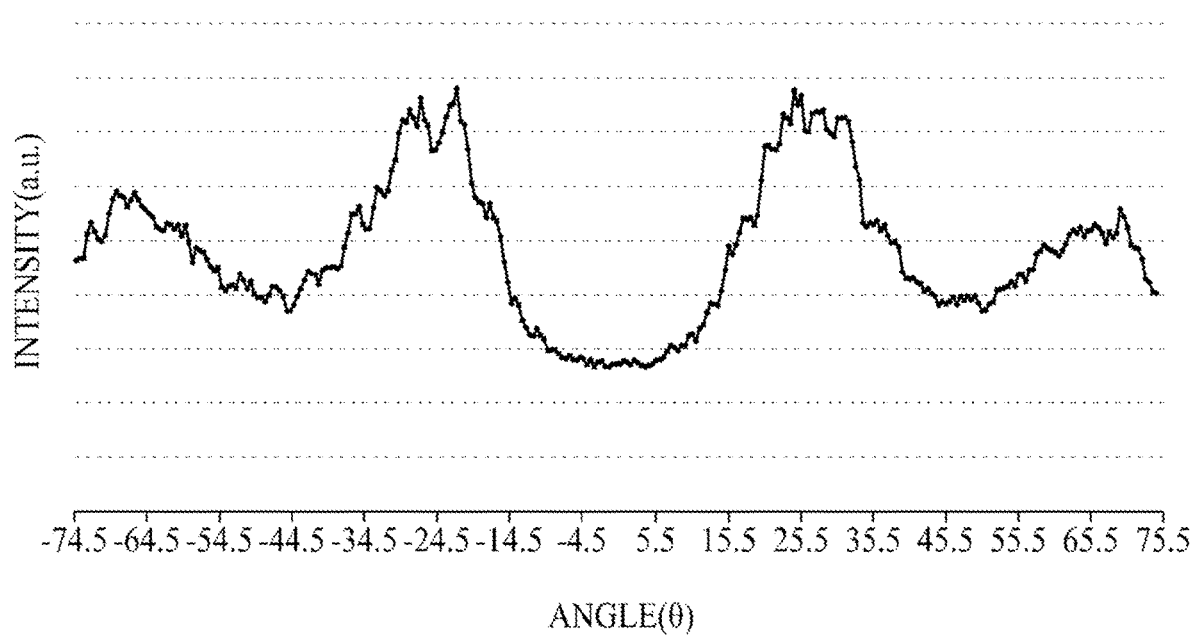
FIG. 4 shows an example of an XRD graph of residual stress inside a copper foil.

Target: 3 kW X-ray tube with Cu target
Power: 40 kV and 40 mA
Wavelength: 1.5406 Å
Measurement range: 30 to 100 degrees
Scan axis: Theta-2Theta
Scan speed: 2 deg/min FIG. 4 shows an example of an XRD graph of residual stress inside a copper foil. In particular, FIG. 4 shows XRD results for measurement of the residual stress of the (200) face of the copper layer 110.

Upon measurement of residual stress, any one is selected from crystal faces of copper, and a 2θ value is fixed, and only a θ value is changed within an angle of 360°, thereby measuring the residual stress. Residual stress may be measured on each of the (111) face, the (200) face, the (220) face, and the (311) face which are four main crystal faces of the copper layer 110.

In particular, in the XRD graph, residual stress may be measured on a crystal face having low intensity but having high resolution, and a measured value thereof may be determined as the residual stress of the copper foil 101. For example, the (200) face of the copper layer 110 has high measurement resolution and high reliability at a high angle. Therefore, the residual stress measured on the (200) face of the copper layer 110 may be the residual stress of the copper foil 101.

According to one embodiment of the present disclosure, the copper foil 101 has an elongation of 2% to 20% after being heat-treated at a temperature of 130° C. for 30 minutes. The elongation may be measured using a universal testing machine (UTM) according to a method specified in the IPC-TM-650 test method manual. According to one embodiment of the present disclosure, equipment manufactured by Instron company may be used. In this case, a width of a sample for measuring elongation is 12.7 mm, a distance between grips is 50 mm, and a test speed is 50 mm/min.

When the elongation of the copper foil 101 is less than 2% after heat treatment at a temperature of 130° C. for 30 minutes, the copper foil 101 may not sufficiently extend in response to great volume expansion of an active material for high capacity when being used as a current collector for a secondary battery, which causes a risk that the copper foil 101 is torn. On the other hand, when the elongation is excessively high, that is, exceeds 20%, the copper foil 101 easily extends in a manufacturing process of an electrode for a secondary battery, which may cause the electrode to be deformed.

In addition, the copper foil 101 may have an elongation of 2% to 20% at room temperature of 25±15° C.

According to one embodiment of the present disclosure, the first surface S1 and the second surface S2 of the copper foil 101 have a difference in arithmetic mean roughness (Ra) of 0.5 μm or less.

The arithmetic mean roughness (Ra) according to one embodiment of the present disclosure is also referred to as surface roughness (Ra). The arithmetic mean roughness (Ra) is determined as a value obtained by obtaining the sum of the total areas above and below a center line of a measurement section (reference length) in a surface roughness profile and dividing the sum by a length of the measurement section. The arithmetic mean roughness (Ra) may be measured according to JIS B 0601-2001 standards using a surface roughness tester (M300 manufactured by Mahr Inc.).

According to another embodiment of the present disclosure, the first surface S1 and the second surface S2 of the copper foil 101 have a difference in ten-point mean roughness (Rz JIS) of 0.5 µm or less.

The ten-point mean roughness (Rz JIS) according to another embodiment of the present disclosure is also referred to as surface roughness (Rz JIS). The ten-point mean roughness (Rz JIS) is determined as a value obtained by adding the sum (absolute value) of distances to five points farthest upward from a center line of a sample section in a surface roughness profile and the sum (absolute value) of distances to five points farthest downward from the center line and dividing the added value by five. The ten-point mean roughness (Rz JIS) is measured according to JIS B 0601-2001 standards using a surface roughness tester (M300 manufactured by Mahr Inc.).

When the difference in surface roughness (Ra or Rz JIS) between the first surface S1 and the second surface S2 of the copper foil 101 exceeds 0.5 µm and when the copper foil 101 is used as a current collector of an electrode for a secondary battery, due to the difference in surface roughness (Ra or Rz JIS) between the first surface S1 and the second surface S2, an active material is not uniformly applied on both surfaces of the first surface S1 and the second surface S2. As a result, upon charge/discharge of a secondary battery, differences in electrical and physical properties between both of the surfaces S1 and S2 may occur, thereby reducing a capacity retention rate and lifetime of the secondary battery.

In addition, according to one embodiment of the present disclosure, the first surface S1 and the second surface S2 of the copper foil 101 may each have a arithmetic mean roughness (Ra) of 0.8 µm to 1.30 µm.

According to one embodiment of the present disclosure, the copper foil 101 has a thickness of 2 µm to 20 µm. When the copper foil 101 is used as a current collector of an electrode in a secondary battery, as the copper foil 101 becomes thinner, more current collectors can be accommodated in a constant space, which is advantageous in increasing the capacity of the secondary battery. However, when the thickness of the copper foil 101 is less than 2 µm, workability is lowered in a manufacturing process of an electrode for a secondary battery and a secondary battery using the copper foil 101.

On the other hand, when the thickness of the copper foil 101 exceeds 20 µm, a thickness of an electrode for a secondary battery using the copper foil 101 is increased, and due to the thick thickness, it may be difficult to implement high capacity of the secondary battery.

Figure 5:
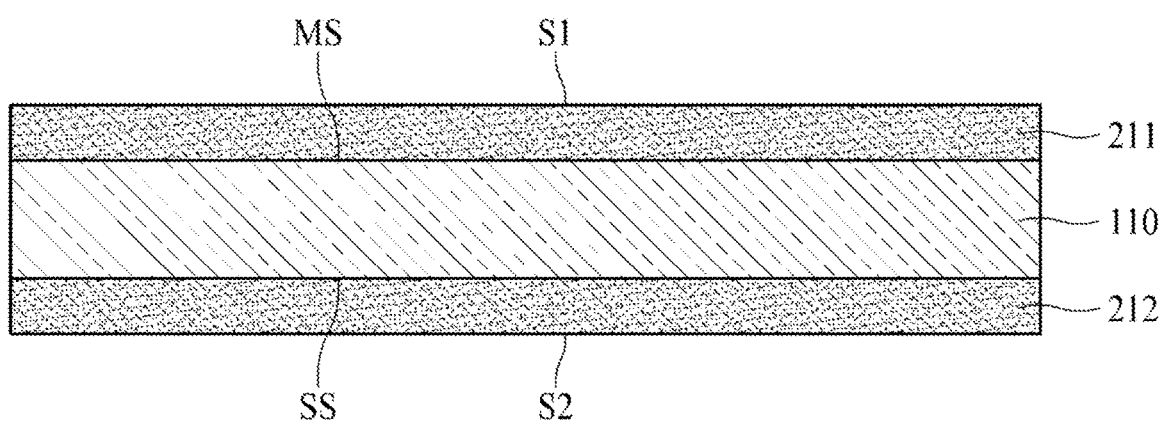
FIG. 5 is a schematic cross-sectional view of a copper foil according to another embodiment of the present disclosure.

FIG. 5 is a schematic cross-sectional view of a copper foil 102 according to another embodiment of the present disclosure. Hereinafter, to avoid repetition, descriptions of the above-described components will be omitted.

Referring to FIG. 5, the copper foil 102 according to another embodiment of the present disclosure includes a copper layer 110 and two anticorrosive films 211 and 212 respectively disposed on a matte surface MS and a shiny surface SS of the copper layer 110. When compared with the copper foil 101 shown in FIG. 1, the copper foil 102 shown in FIG. 5 further includes the anticorrosive film 212 disposed on the shiny surface SS of the copper layer 110.

For convenience of description, among the two anticorrosive films 211 and 212, the anticorrosive film 211 disposed on the matte surface MS of the copper layer 110 is also referred to as a first protective layer, and the anticorrosive film 212 disposed on the shiny surface SS is also referred to as a second protective layer.

In addition, with respect to the copper layer 110, the copper foil 102 shown in FIG. 5 has a first surface S1 that is a surface in the direction of the matte surface MS and a second surface S2 that is a surface in the direction of the shiny surface SS. Here, the first surface S1 of the copper foil 102 is a surface of the anticorrosive film 211 disposed on the matte surface MS, and the second surface S2 is a surface of the anticorrosive film 212 disposed on the shiny surface SS.

According to another embodiment of the present disclosure, the two anticorrosive films 211 and 212 may include at least one selected from among chromium (Cr), a silane compound, and a nitrogen compound.

The copper layer 110 of the copper foil 102 shown in FIG. 5 has a crystalline structure, and a ratio of diffraction intensity of a (220) face to the sum of diffraction intensities of (111), (200), (220), and (311) faces of the crystalline structure is in a range of 10% to 40%.

The copper foil 102 has a residual stress of 0.5 MPa to 25 MPa based on an absolute value. Residual stress may be measured on at least one of the (111) surface, the (200) surface, the (220) surface, and the (311) surface of crystal faces of the copper layer 110. More specifically, the residual stress may be measured on the (200) face.

After heat treatment at a temperature of 130° C. for 30 minutes, the copper foil 102 has an elongation of 2% to 20%, and a difference in arithmetic mean roughness (Ra) or ten-point mean roughness (Rz JIS) between the first surface S1 and the second surface S2 of the copper foil 102 is 0.5 µm or less.

The copper foil 102 of FIG. 5 has a thickness of 2 µm to 20 µm.

Figure 6:
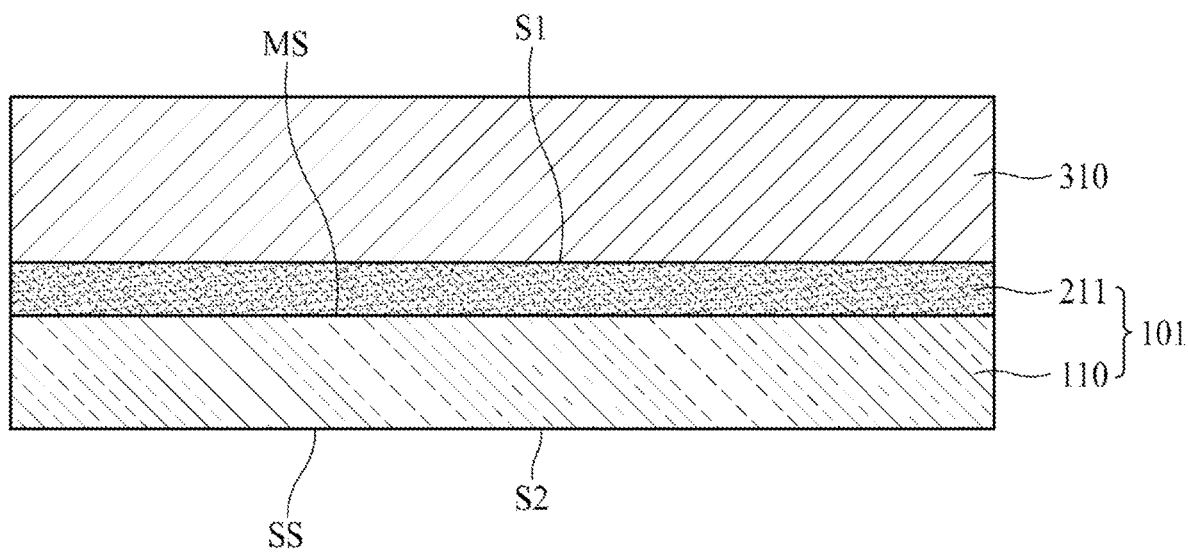
FIG. 6 is a schematic cross-sectional view of an electrode for a secondary battery according to still another embodiment of the present disclosure.

FIG. 6 is a schematic cross-sectional view of an electrode 103 for a secondary battery according to still another embodiment of the present disclosure. The electrode 103 for a secondary battery shown in FIG. 6 may be applied, for example, to a secondary battery 105 shown in FIG. 8.

Referring to FIG. 6, the electrode 103 for a secondary battery according to still another embodiment of the present disclosure includes a copper foil 101 and an active material layer 310 disposed on the copper foil 101. Here, the copper foil 101 includes a copper layer 110 and an anticorrosive film 211 disposed on the copper layer 110 and is used as a current collector.

Specifically, the copper foil 101 has a first surface S1 and a second surface S2, and the active material layer 310 is disposed on at least one of the first surface S1 and the second surface S2 of the copper foil 101. The active material layer 310 may be disposed on the anticorrosive film 211.

FIG. 6 shows an example in which the copper foil 101 of FIG. 1 is used as a current collector. However, still another embodiment of the present disclosure is not limited thereto, and the copper foil 102 shown in FIG. 5 may be used as a current collector of the electrode 103 for a secondary battery.

In addition, FIG. 6 illustrates a structure in which the active material layer 310 is disposed only on the first surface S1 of the copper foil 101, but still another embodiment of the present disclosure is not limited thereto. The active material layer 310 may be disposed on both the first and second surfaces S1 and S2 of the copper foil 101. In addition, the active material layer 310 may be disposed only on the second surface S2 of the copper foil 101.

The active material layer 310 shown in FIG. 6 may be made of an electrode active material, and in particular, may be made of an anode active material. That is, the electrode 103 for a secondary battery shown in FIG. 6 may be used as an anode.

The active material layer 310 may include at least one selected from among carbon, a metal, a metal oxide, and a composite of a metal and carbon. As the metal, at least one selected from among germanium (Ge), tin (Sn), lithium (Li), zinc (Zn), magnesium (Mg), cadmium (Cd), cerium (Ce), nickel (Ni), and iron (Fe) may be used. In addition, in order to increase the charge/discharge capacity of a secondary battery, the active material layer 310 may include silicon (Si).

As a secondary battery is repeatedly charged and discharged, the active material layer 310 is alternately contracted and expanded to cause the separation of the active material layer 310 from the copper foil 101, thereby reducing the charge/discharge efficiency of the secondary battery. In particular, the active material layer 310 including silicon (Si) has a large degree of expansion and contraction.

According to still another embodiment of the present disclosure, since the copper foil 101 used as a current collector may contract and expand in response to the contraction and expansion of the active material layer 310, even when the active material layer 310 contracts and expands, the copper foil 101 is not deformed or torn. Thus, the copper foil 101 and the active material layer 310 are not separated. As a result, a secondary battery including the electrode 103 for a secondary battery has excellent charge/discharge efficiency and an excellent capacity retention rate.

Figure 7:
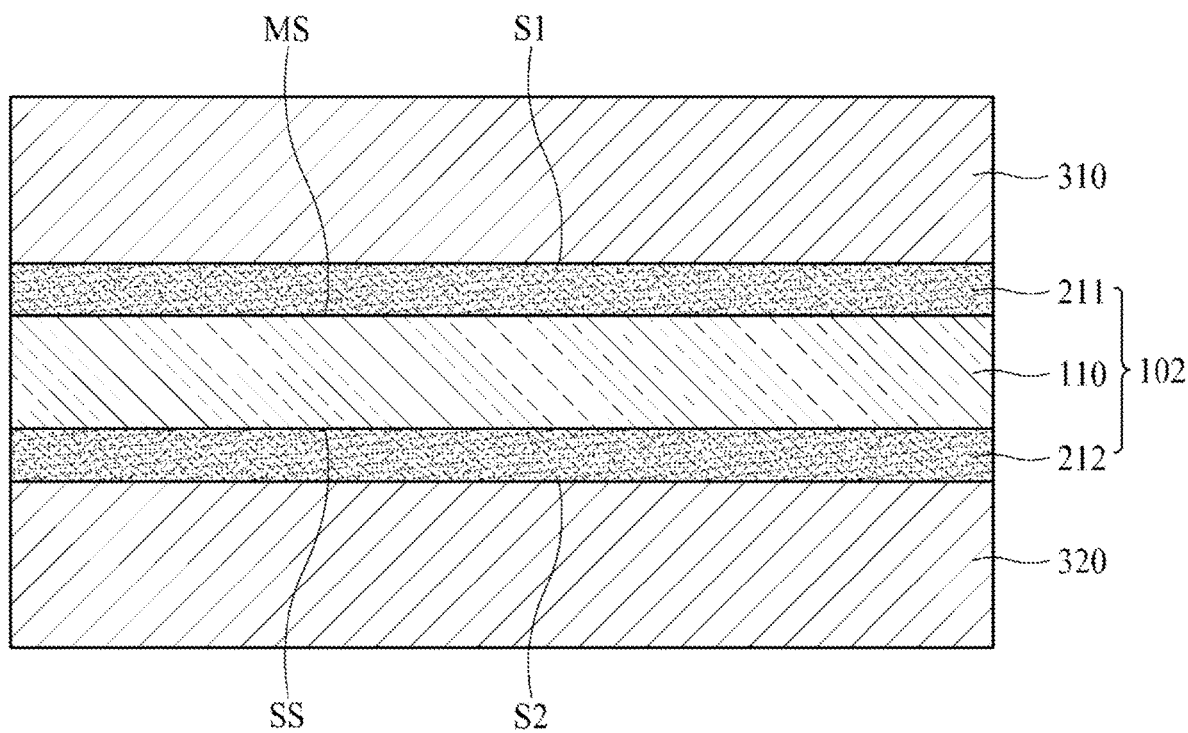
FIG. 7 is a schematic cross-sectional view of an electrode for a secondary battery according to yet another embodiment of the present disclosure.

FIG. 7 is a schematic cross-sectional view of an electrode 104 for a secondary battery according to yet another embodiment of the present disclosure.

The electrode 104 for a secondary battery according to yet another embodiment of the present disclosure includes a copper foil 102 and active material layers 310 and 320 disposed on the copper foil 102. The copper foil 102 includes a copper layer 110 and anticorrosive films 211 and 212 disposed on both surfaces of the copper layer 110.

Specifically, the electrode 104 for a secondary battery shown in FIG. 7 includes two active material layers 310 and 320 disposed on first and second surfaces S1 and S2 of the copper foil 102, respectively. Here, the active material layer 310 disposed on the first surface S1 of the copper foil 102 is also referred to as a first active material layer, and the active material layer 320 disposed on the second surface S2 of the copper foil 102 is also referred to as a second active material layer.

The two first and second active material layers 310 and 320 may be made of the same material through the same method and may be made of different materials or formed through different methods.

Figure 8:
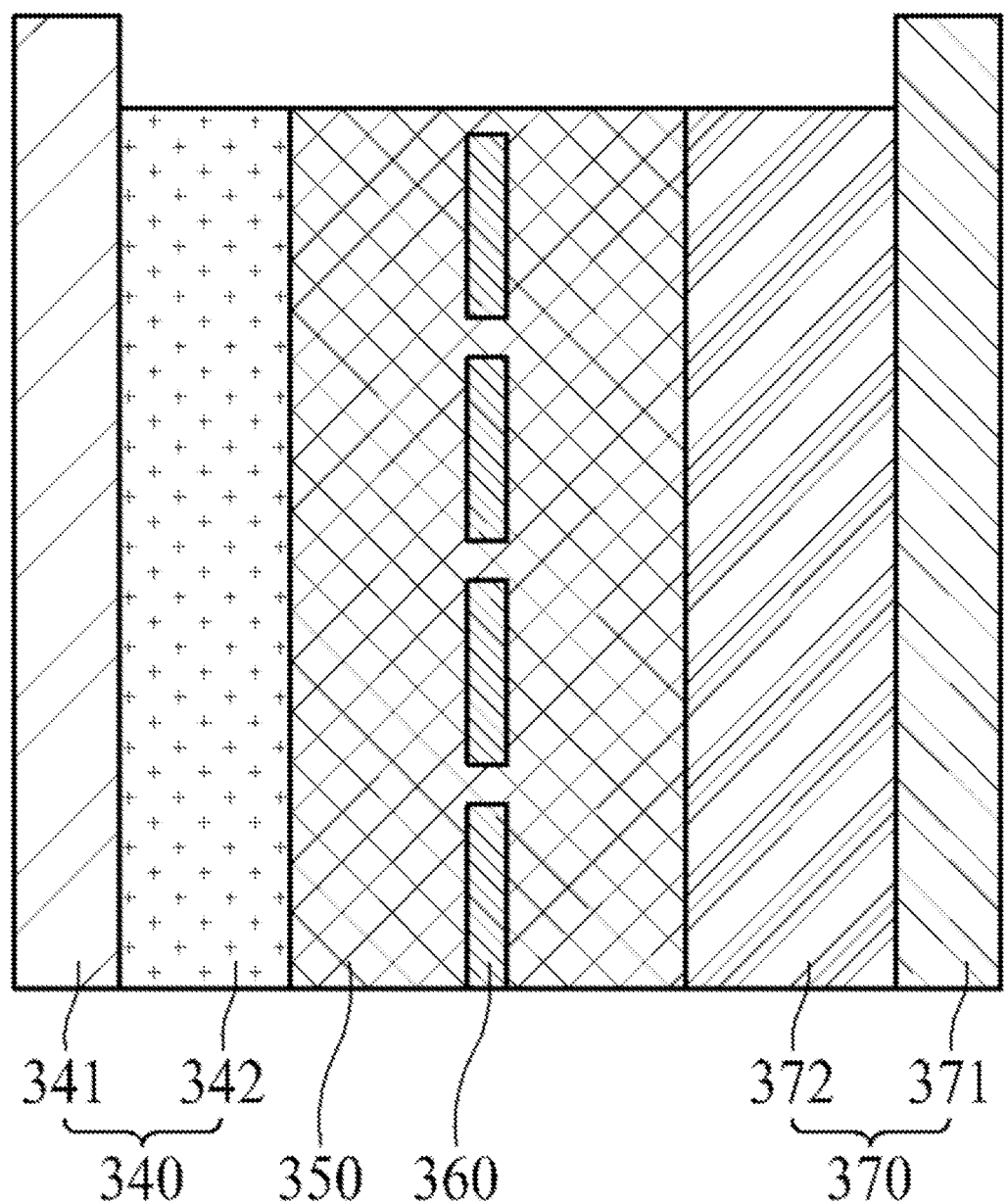
FIG. 8 is a schematic cross-sectional view of a secondary battery according to yet another embodiment of the present disclosure.

FIG. 8 is a schematic cross-sectional view of a secondary battery 105 according to yet another embodiment of the present disclosure. The secondary battery 105 shown in FIG. 8 is, for example, a lithium secondary battery.

Referring to FIG. 8, the secondary battery 105 includes a cathode 370, an anode 340 disposed opposite to the cathode 370, an electrolyte 350 disposed between the cathode 370 and the anode 340 to provide an environment in which ions are movable, and a separator 360 electrically insulating the cathode 370 and the anode 340. Here, the ions moving between the cathode 370 and the anode 340 are, for example, lithium ions. The separator 360 separates the cathode 370 and the anode 340 in order to prevent charges generated in one electrode from being consumed by moving to another electrode through the inside of the secondary battery 105. Referring to FIG. 8, the separator 360 is disposed in the electrolyte 350.

The cathode 370 may include a cathode current collector 371 and a cathode active material layer 372. An aluminum foil may be used as the cathode current collector 371.

The anode 340 includes an anode current collector 341 and an active material layer 342. The active material layer 342 of the anode 340 includes an anode active material.

The copper foil 101 or 102 shown in FIG. 1 or 5 may be used as the anode current collector 341. In addition, the electrode 103 or 104 for a secondary battery shown in FIG. 6 or 7 may be used as the anode 340 of the secondary battery 105 shown in FIG. 8.

Hereinafter, a method of manufacturing a copper foil 102 according to yet another embodiment of the present disclosure will be described in detail with reference to FIG. 9.

FIG. 9 is a schematic view of a method of manufacturing the copper foil 102 shown in FIG. 5.

In order to manufacture the copper foil 102, first, an electrolyte 11 including copper ions is prepared. The electrolyte 11 is accommodated in an electrolytic cell 10.

Next, a copper layer 110 is formed by applying a current at a current density of 30 to 70 ASD (A/dm$^2$) to a cathode plate 13 and a rotating anode drum 12 disposed to be spaced apart from each other in the electrolyte 11. The copper layer 110 is formed by a principle of electroplating. A distance between the cathode plate 13 and the rotating anode drum 12 may be adjusted in a range of 8 mm to 13 mm.

When the current density of the current applied between the cathode plate 13 and the rotating anode drum 12 is less than 30 ASD, the generation of crystal grains is facilitated in the copper layer 110, and when the current density exceeds 70 ASD, crystal grains rapidly become finer. More specifically, the current density may be adjusted to 40 ASD or more.

The surface characteristics of a shiny surface SS of the copper layer 110 may be changed according to the buffing or polishing degree of a surface of the rotating anode drum 12. In order to adjust the surface characteristics in the direction of the shiny surface SS, for example, the surface of the rotating anode drum 12 may be polished using a polishing brush having a grit of #800 to #3000.

In a process of forming the copper layer 110, the electrolyte 11 is maintained at a temperature of 40° C. to 70° C. More specifically, the electrolyte 11 may be maintained at a temperature of 50° C. or more. In this case, by adjusting a composition of the electrolyte 11, the physical, chemical, and electrical properties of the copper layer 110 may be controlled.

According to one embodiment of the present disclosure, the electrolyte 11 includes copper ions at a concentration of 70 g/L to 100 g/L, a sulfuric acid at a concentration of 70 g/L to 150 g/L, chlorine (Cl) at a concentration of 1 ppm to 45 ppm, arsenic (As) ions at a concentration of 0.6 g/L or less, and an organic additive.

In order to facilitate the formation of the copper layer 110 through copper electrodeposition, the concentration of the copper ions and the concentration of the sulfuric acid in the electrolyte 11 are adjusted in a range of 70 g/L to 100 g/L and a range of 70 g/L to 150 g/L, respectively.

In one embodiment of the present disclosure, chlorine (Cl) includes all of chlorine ions (Cl$^-$) and chlorine atoms present in a molecule. Chlorine (Cl) may, for example, be used to remove silver (Ag) ions introduced into the electrolyte 11 in a process of forming the copper layer 110. Specifically, chlorine (Cl) may precipitate silver (Ag) ions in the form of silver chloride (AgCl). The silver chloride (AgCl) can be removed through filtration.

When the concentration of the chlorine (Cl) is less than 1 ppm, silver (Ag) ions are not removed well. On the other hand, when the concentration of the chlorine (Cl) exceeds 45 ppm, unnecessary reaction may occur due to the excessive amount of the chlorine (Cl). Therefore, the concentration of the chlorine (Cl) in the electrolyte 11 is controlled in a range of 1 ppm to 45 ppm. More specifically, the concentration of the chlorine (Cl) may be controlled to be 25 ppm or less, for example, to be in a range of 5 ppm to 25 ppm.

The concentration of the arsenic (As) ions in the electrolyte 11 is controlled in a range of 0.05 mg/L to 0.6 g/L. More specifically, the concentration of the arsenic (As) ions in the electrolyte 11 is controlled in a range of 0.1 g/L to 0.3 g/L. However, arsenic (As) in the electrolyte 11 may be present in, for example, a trivalent or pentavalent ion state ($As^{3+}$ or $As^{5+}$). Since arsenic (As) has more excellent adsorption properties in the case of pentavalent ions than in the case of trivalent ions, the arsenic (As) should be controlled at a lower concentration. Therefore, when the arsenic (As) is included as pentavalent ions, a concentration of arsenic ions ($As^{5+}$) is controlled to be 0.3 g/L or less. On the other hand, when the arsenic (As) is contained as trivalent ions ($As^{3+}$), the concentration of the arsenic (As) ions is controlled to be 0.6 g/L or less. However, one embodiment of the present disclosure is not limited thereto.

Arsenic ions ($As^{5+}$) serve as an accelerator for accelerating a reduction reaction of copper (Cu) in a certain concentration section. When the concentration of the arsenic ions ($As^{5+}$) is 3 g/L or less, in a process of forming the copper layer 110, on the basis of crystal faces, a (220) face is first grown.

On the other hand, when the concentration of the arsenic ions ($As^{5+}$) exceeds 0.3 g/L, and when $Cu^{2+}$ or $Cu^{1+}$, which is a copper ion, is deoxidized into copper (Cu), an insoluble compound is formed, and impurities may be electrodeposited (incorporated) together on the copper layer 110. In addition, when the concentration of the arsenic ions ($As^{5+}$) is high, in a process of forming the copper layer 110, on the basis of the crystal faces, a (311) face, a (111) face, and a (100) face may be first grown, and the growth of the (220) face may be suppressed.

Therefore, in order for a ratio of diffraction intensity of the (220) face to the sum of diffraction intensities of the (111), (200), (220), and (311) faces to be in a range of 10% to 40% in a crystalline structure of the copper layer 110, the concentration of the arsenic ions ($As^{5+}$) in the electrolyte 11 is adjusted to 0.3 g/L or less.

Meanwhile, according to one embodiment of the present disclosure, for the crystal orientation of the copper layer 110, the arsenic (As) ions in the electrolyte 11 may have a concentration of 0.05 g/L or more. That is, the arsenic (As) ions in the electrolyte 11 may have a concentration of 0.05 g/L to 0.6 g/L.

The organic additive included in the electrolyte 11 includes at least one of a polishing agent (component A), a moderator (component B), a leveling agent (component C), and a roughness regulator (component D). The organic additive in the electrolyte 11 has a concentration of 1 ppm to 150 ppm The organic additive may include two or more of the polishing agent (component A), the moderator (component B), the leveling agent (component C), and the roughness regulator (component D) and may include all of the four components. Even in this case, the concentration of the organic additive is 150 ppm or less. When the organic additive includes all of the polishing agent (component A), the moderator (component B), the leveling agent (component C), and the roughness regulator (component D), the organic additive may have a concentration of 10 ppm to 150 ppm.

The polishing agent (component A) includes a sulfonic acid or a metal salt thereof. The polishing agent (component A) may have a concentration of 1 ppm to 50 ppm in the electrolyte 11.

The polishing agent (component A) may increase an amount of electric charges of the electrolyte 11 to improve an electroplating speed of copper, may improve the curling characteristics of the copper foil, and may increase the gloss of the copper foil 102. When the concentration of the polishing agent (component A) is less than 1 ppm, the gloss of the copper foil 102 is lowered, and when the concentration exceeds 50 ppm, roughness of the copper foil 102 may be increased, and strength thereof may be lowered.

More specifically, the polishing agent (component A) may have a concentration of 5 ppm to 30 ppm in the electrolyte 11.

The polishing agent may include, for example, at least one selected from among a bis-(3-sulfopropyl)-disulfide disodium salt (SPS), a 3-mercapto-1-propanesulfonic acid, a 3-(N,N-dimethylthiocarbamoyl)-thiopropanesulfonate sodium salt, a 3-[(amino-iminomethyl)thio]-1-propanesulfonate sodium salt, an O-ethyldithiocarbonato-S-(3-sulfopropyl)-ester sodium salt, a 3-(benzothiazolyl-2-mercapto)-propyl-sulfonic acid sodium salt, and an ethylenedithiodipropylsulfonic acid sodium salt.

The moderator (component B) includes a nonionic water-soluble polymer. The moderator (component B) may have a concentration of 5 ppm to 50 ppm in the electrolyte 11.

The moderator (component B) reduces an electroplating speed of copper to prevent an abrupt increase in roughness and a decrease in strength of the copper foil 102. Such a moderator (component B) is also referred to as an "inhibitor" or "suppressor."

When the concentration of the moderator (component B) is lower than 5 ppm, the roughness of the copper foil 102 may be rapidly increased, and the strength of the copper foil 102 may be lowered. On the other hand, although the concentration of the moderator (component B) exceeds 50 ppm, there is almost no change in physical properties such as appearance, gloss, roughness, strength, and elongation of the copper foil 102. Accordingly, without increasing manufacturing costs and wasting raw materials due to an unnecessary increase in concentration of the moderator (component B), the concentration of the moderator (component B) may be adjusted in a range of 5 ppm to 50 ppm.

The moderator (component B) may include, for example, at least one nonionic water-soluble polymer selected from among a polyethylene glycol (PEG), polypropylene glycol, a polyethylene polypropylene copolymer, polyglycerin, polyethylene glycol dimethyl ether, hydroxyethylene cellulose, polyvinyl alcohol, stearic acid polyglycol ether, and stearyl alcohol polyglycol ether. However, the type of the moderator is not limited thereto, and other nonionic water-soluble polymers usable to manufacture the high strength copper foil 102 may be used as a moderator.

The nonionic water-soluble polymer used as the moderator (component B) may have a number average molecular weight of 500 to 30,000. When the number average molecular weight of the moderator (component B) is less than 500, the effects of the moderator (component B) on preventing an increase in roughness and a decrease in strength of the copper foil 102 may be insufficient, and when the number average molecular weight of the moderator exceeds 3,000, the copper layer 110 may not be easily formed due to a large molecular weight of the moderator (component B).

More specifically, the nonionic water-soluble polymer used as the moderator (component B) may have a molecular weight of 1,000 to 10,000.

The leveling agent (component C) includes at least one selected from nitrogen (N) and sulfur (S). That is, the leveling agent (component C) may include one or more nitrogen atoms (N) or one or more sulfur atoms (S) in one molecule and may include one or more nitrogen atoms (N) and one or more sulfur atoms (S). For example, the leveling agent (component C) is an organic compound including at least one selected from nitrogen (N) and sulfur (S).

The leveling agent (component C) prevents the formation of excessively high peaks or excessively large protrusions in the copper layer 110 to enable the copper layer 110 to be macroscopically planarized. The leveling agent (component C) may have a concentration of 1 ppm to 20 ppm in the electrolyte 11.

When the concentration of the leveling agent (component C) is less than 1 ppm, the strength of the copper foil 102 is decreased, which makes it difficult to manufacture the high strength copper foil 102. On the other hand, when the concentration of the leveling agent (component C) exceeds 20 ppm, surface roughness of the copper foil 102 may be excessively increased to decrease strength, and pinholes or curling may occur on a surface of the copper foil 102, which makes it difficult to separate the copper foil 102 from a winder WR after being manufactured.

The leveling agent (component C) may include, for example, at least one selected from among thiourea (TU), diethylthiourea, ethylenethiourea, acetylenethiourea, dipropylthiourea, dibutylthiourea, N-trifluoroacetylthiourea, N-ethylthiourea, N-cyanoacetylthiourea, N-allylthiourea, o-tolylthiourea, N,N'-butylenethiourea, thiazolidinethiol, 4-thiazolinethiol, 4-methyl-2-pyrimidinethiol, 2-thiouracil, a 3-(benzotriazole-2-mercapto)-pyrosulfuric acid, 2-mercaptopyridine, 3-(5-mercapto-1H-tetrazole)benzenesulfonate, 2-mercaptobenzothiazole, dimethylpyridine, 2,2'-bipyridine, 4,4'-bipyridine, pyrimidine, pyridazine, pyrinoline, oxazole, thiazole, 1-methylimidazole, 1-benzylimidazole, 1-methyl-2-methylimidazole, 1-benzyl-2-methylimidazole, 1-ethyl-4-methylimidazole, N-methylpyrrole, N-ethylpyrrole, N-butylpyrrole, N-methylpyrroline, N-ethylpyrroline, N-butylpyrroline, purine, quinoline, isoquinoline, N-methylcarbazole, N-ethylcarbazole, and N-butylcarbazole.

The roughness regulator (component D) includes a nitrogen-containing heterocyclic quaternary ammonium salt or a derivative thereof.

The roughness regulator (component D) improves glossiness and evenness of the copper foil 102. The roughness regulator (component D) may have a concentration of 0.01 ppm to 50 ppm in the electrolyte 11.

When the concentration of the roughness regulator (component D) is less than 0.01 ppm, the effects of improving glossiness and evenness of the copper foil 102 may not be exhibited. On the other hand, when the concentration of the roughness regulator (component D) exceeds 50 ppm, surface gloss becomes non-uniform and surface roughness is abruptly increased in the direction of a first surface S1, that is, in the direction of a matte surface MS of the copper foil 102, and it is difficult to secure a desired roughness range. More specifically, the roughness regulator (component D) may have a concentration of 3 ppm to 20 ppm in the electrolyte 11.

The roughness regulator (component D) may include at least one selected from among compounds represented by Formulae 1 to 6 below. Specifically, the roughness regulator (component D) may include the compound represented by Formula 6 below.

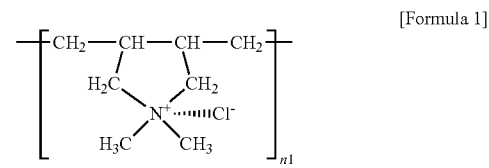

[Formula 1]

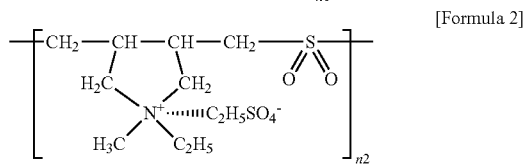

[Formula 2]

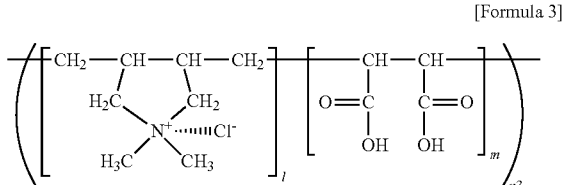

[Formula 3]

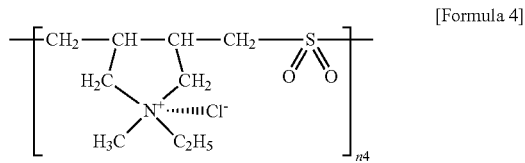

[Formula 4]

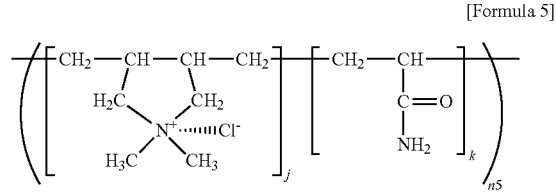

[Formula 5]

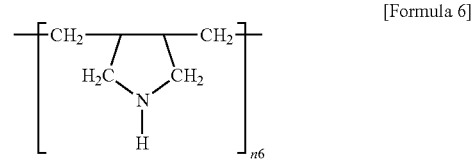

[Formula 6]

In Formulae 1 to 6, j, k, l, m, and n1 to n5 may each refer to a repeating unit, may be an integer of one or more, and may be identical to or different from each other.

According to one embodiment of the present disclosure, the compounds represented by Formulae 1 to 6 each have a number average molecular weight of 500 to 12,000.

When the number average molecular weight of the compounds represented by Formulae 1 to 6 used as the roughness regulator is less than 500, surface roughness of the copper foil 102 is increased due to a high ratio of monomers. When the content of the roughness regulator is low, surface roughness of the matte surface MS of the copper layer 110 may be increased to decrease grossness and evenness.

When the number average molecular weight of the compounds represented by Formulae 1 to 6 exceeds 12,000, a surface roughness deviation of the copper foil 102 is increased. In this case, although a concentration of other additives is controlled, it is difficult to suppress an increase in surface roughness deviation in the direction of the matte surface of the copper foil 102.

The compounds represented by Formulae 1 to 6 may, for example, be prepared through polymerization or copolymerization using diallyl dimethyl ammonium chloride (DDAC).

As the compound represented by Formula 1, there is PAS-H-1L (with MW 8,500 manufactured by Nitto Boseki Co., Ltd.) or the like.

As the compound represented by Formula 2, for example, there is PAS-2451 (with MW 30,000 manufactured by Nitto Boseki Co., Ltd.), PAS-2401 (with MW 2,000 manufactured by Nitto Boseki Co., Ltd.), or the like.

As the compound represented by Formula 3, for example, there is PAS-2351 (with MW 25,000 manufactured by Nitto Boseki Co., Ltd.) or the like.

As the compound represented by Formula 4, for example, there is PAS-A-1 (with MW 5,000 manufactured by Nitto Boseki Co., Ltd.), RAS-A-5 (with MW 4,000 manufactured by Nitto Boseki Co., Ltd.), or the like.

As the compound represented by Formula 5, for example, there is PAS-J-81L (with MW 10,000 manufactured by Nitto Boseki Co., Ltd.), PAS-J-41 (with MW 10,000 manufactured by Nitto Boseki Co., Ltd.), or the like.

As the compound represented by Formula 6, for example, there is PAS-21 (with MW 5,000 manufactured by Nitto Boseki Co., Ltd.) or the like.

According to one embodiment of the present disclosure, the electrolyte 11 including the organic additive may further include hydrogen peroxide ($H_2O_2$). Due to the organic additive, organic impurities may be present in the electrolyte 11 that is continuously plated, and the organic impurities may be treated with hydrogen peroxide and decomposed to adjust a content of carbon (C) in the copper foil. As a concentration of total organic carbon (TOC) in the electrolyte 11 is increased, an amount of carbon (C) elements introduced into the copper layer 110 is increased, which causes an increase in total amount of elements detached from the copper layer 110 during heat treatment and thus causes a decrease in strength of the copper foil 102 after heat treatment.

Hydrogen peroxide is added in an amount of 0.01 ml to 0.1 ml with respect to one L of the electrolyte. Specifically, the hydrogen peroxide may be added in an amount of 0.05 ml to 0.08 ml with respect to one L of the electrolyte. When the amount of the added hydrogen peroxide is less than 0.01 ml/L, it is meaningless because there is little effect of decomposing organic impurities. When the amount of the added hydrogen peroxide exceeds 0.1 ml/L, organic impurities are excessively decomposed, and thus, the effects of organic additives such as a polishing agent, a moderator, a leveling agent, and a roughness regulator are also suppressed.

According to one embodiment of the present disclosure, by adjusting a concentration of an organic additive added in the electrolyte 11, in particular, a concentration of an organic additive including nitrogen (N) or sulfur (S), a predetermined amount of carbon (C), hydrogen (H), nitrogen (N), or sulfur (S) may be allowed to be incorporated into the copper layer 110. The crystal orientation of the copper layer 110 may be controlled through such incorporation.

The forming of the copper layer 110 may include at least one of an operation of filtering the electrolyte 11 using activated carbon, an operation of filtering the electrolyte 11 using diatomaceous earth, and an operation of treating the electrolyte 11 with ozone ($O_3$).

Specifically, in order to filter the electrolyte 11, the electrolyte 11 may be circulated at a flow rate of 35 m³/hour to 45 m³/hour. That is, in order to remove solid impurities present in the electrolyte 11 during electroplating to form the copper layer 110, filtering may be performed at a flow rate of 35 m³/hour to 45 m³/hour. In this case, activated carbon or diatomaceous earth may be used.

In order to maintain cleanliness of the electrolyte 11, the electrolyte 11 may be treated with ozone ($O_3$).

In addition, in order to maintain the clearness of the electrolyte 11, a copper (Cu) wire used as a raw material for the electrolyte 11 may be cleaned.

According to one embodiment of the present disclosure, the preparing of the electrolyte 11 may include heat-treating a copper wire, cleaning the heat-treated copper wire with an acid, cleaning the acid-cleaned copper wire with water, and inputting the water-cleaned copper wire into a sulfuric acid for an electrolyte.

More specifically, in order to maintain the clearness of the electrolyte 11, a Cu wire with a high purity (99.9% or more) is heat-treated in an electric furnace at a temperature of 750° C. to 850° C. to burn various organic impurities attached to the Cu wire, the heat-treated Cu wire is acid-cleaned using a 10% sulfuric acid solution for 10 to 20 minutes, and the acid-cleaned Cu wire is then water-cleaned using distilled water, thereby preparing copper for manufacturing the electrolyte 11. The water-cleaned Cu wire may be input into a sulfuric acid for an electrolyte to prepare the electrolyte 11.

According to one embodiment of the present disclosure, in order to satisfy the characteristics of the copper foil 102, the concentration of TOC in the electrolyte 11 is controlled to be 200 ppm or less. That is, the electrolyte 11 may have a TOC concentration of 200 ppm or less.

The copper layer 110 manufactured as above may be cleaned in a cleaning tank 20.

For example, an acid cleaning process for removing impurities on a surface of the copper layer 110, for example, resin components or natural oxides, and a water cleaning process for removing acidic solutions used for the acid cleaning may be sequentially performed. The cleaning process may be omitted.

Next, anticorrosive films 211 and 212 are formed on the copper layer 110.

Referring to FIG. 7, the copper layer 110 may be immersed in an anticorrosive liquid 31 contained in an anticorrosive liquid tank 30 to form the anticorrosive films 211 and 212 on the copper layer 110. The anticorrosive liquid 31 may include chromium, and the chromium (Cr) may be present in an ion state in the anticorrosive liquid 31.

The anticorrosive liquid 31 may include chromium at a concentration of 1 g/L to 10 g/L. In order to form the anticorrosive films 211 and 212, a temperature of the anticorrosive liquid 31 may be maintained in a range of 20° C. to 40° C. The copper layer 110 may be immersed in the anticorrosive liquid 31 for about 1 to 30 seconds.

Meanwhile, the anticorrosive films 211 and 212 may include a silane compound through treatment with silane and a nitrogen compound through treatment with nitrogen.

The anticorrosive films 211 and 212 are formed to manufacture the copper foil 102.

Next, the copper foil 102 is cleaned in a cleaning tank 40. Such a cleaning process may be omitted.

Next, after a drying process is performed, the copper foil 102 is wound around a winder WR.

Hereinafter, the present disclosure will be described in detail through Manufacturing Examples and Comparative Examples. However, the following Manufacturing Examples and Comparative Examples are provided to aid in the understanding of the present disclosure, but the scope of the present disclosure is not limited to Manufacturing Examples and Comparative Examples.

Manufacturing Examples 1 to 4 and Comparative Examples 1 to 4

A copper foil was manufactured using a foil making machine including an electrolytic cell 10, a rotating anode drum 12 disposed in the electrolytic cell 10, and a cathode plate 13 disposed to be spaced apart from the rotating anode drum 12. The electrolyte 11 was a copper sulfate solution. In the electrolyte 11, a concentration of copper ions was 87 g/L, a concentration of a sulfuric acid was 110 g/L, and a concentration of hydrogen peroxide ($H_2O_2$) was maintained in a range of 0.05 ppm to 0.08 ml/L. A temperature of the electrolyte was set to 55° C., and a current density was set to 60 ASD In addition, concentrations of arsenic (As) ions ($As^{3+}$ and $As^{5+}$), chlorine (Cl), and an organic additive included in the electrolyte 11 are shown in Table 1 below.

In the organic additive, an SPS was used as a polishing agent (component A), PEG was used as a moderator (component B), TU was used as a leveling agent (component C), and a cyclopolymer (PAS-21™ with MW 5,000 manufactured by Nitto Boseki Co., Ltd.) derived from diallylamine, represented by Formula 6, was used as a roughness regulator (component D).

A copper layer 110 was manufactured by applying a current at a current density of 60 ASD between the rotating anode drum 12 and the cathode plate 13. Next, the copper layer 110 was immersed in an anticorrosive liquid for about 2 seconds to perform chromate treatment on a surface of the copper layer 110 to form anticorrosive films 211 and 212, thereby manufacturing a copper foil 102. As the anticorrosive liquid, an anticorrosive liquid including a chromic acid as a main component was used, and a concentration of the chromic acid was 5 g/L.

As a result, copper foils of Manufacturing Examples 1 to 4 and Comparative Examples 1 to 4 were manufactured.

(i) Residual stress, (ii) a crystalline particle size of a (220) face, (iii) a ratio of diffraction intensity of the (220) face, (iv) a content of carbon, (v) elongation after heat treatment, (vi) a difference in surface roughness (Ra or Rz JIS) between a first surface and a second surface of a copper foil, and (vii) curling of the copper foil were measured on the above manufactured copper foils of Manufacturing Examples 1 to 4 and Comparative Examples 1 to 4.

In addition, a secondary battery was manufactured using the copper foil, charging and discharging were performed on the secondary battery, and then, (viii) the secondary battery was disassembled to observe whether wrinkles occurred.

(i) Measurement of Residual Stress

Residual stress of the copper foil was manufactured using XRD. More specifically, residual stress of each crystal face of the copper layer 110 was measured using XRD of crystal faces of the copper layer 110.

XRD analysis conditions of the copper foil at room temperature are as follows.

Measurement device (model name): Bruker D8 DIS-COVER
Target: 3 kW X-ray tube with Cu target
Power: 40 kV and 40 mA
Wavelength: 1.5406 Å
Measurement range: 30 to 100 degrees
Scan axis: Theta-2Theta
Scan speed: 2 deg/min Specifically, residual stress measurement conditions of the crystal face of the copper layer 110 constituting the copper foil are shown in Table 2 below.

TABLE 2

| Anode material | Cu |
|---|---|
| K-Alpha1 wavelength | 1.540598 |
| K-Alpha2 wavelength | 1.544426 |
| Ratio K-Alpha2/K-Alpha1 | 0.5 |
| Divergence slit | Fixed 3.00 mm |
| Monochromator used | YES |
| Generator voltage | 40 |
| Tube current | 20 |
| Scan axis | Psi |
| Scan range | −74.75 to 74.75 |
| Scan step size | 0.5 |
| No. of points | 299 |
| Scan type | CONTINUOUS |
| 2Theta | 89.9805 |
| Omega | 44.9903 |
| Phi | 0 |
| X | 2 |

TABLE 1

| | $As^{3+}$ (g/L) | $As^{5+}$ (g/L) | Cl (ppm) | SPS (component A) (ppm) | PEG (component B) (ppm) | TU (component C) (ppm) | PAS-2401 (component D) (ppm) |
|---|---|---|---|---|---|---|---|
| Manufacturing Example 1 | — | 0.05 | 17 | 5 | 15 | 1 | 5 |
| Manufacturing Example 2 | 0.1 | 0.1 | 22 | 30 | 30 | — | — |
| Manufacturing Example 3 | 0.6 | — | 5 | — | — | — | — |
| Manufacturing Example 4 | — | 0.28 | 35 | 10 | 12 | 8 | — |
| Comparative Example 1 | 0.35 | — | 20 | 5 | 15 | 22 | 10 |
| Comparative Example 2 | — | 0.22 | 18 | 55 | 35 | — | 55 |
| Comparative Example 3 | 0.45 | — | 5 | — | — | — | — |
| Comparative Example 4 | — | 1.2 | 55 | 15 | 15 | 3 | 5 |

TU: thiourea PAS-2401: diallylmethylethyl ammonium ethyl salt-sulphur dioxide copolymer (with MW 2,000 manufactured by Nitto Boseki Co., Ltd)

TABLE 2-continued

| Y | 4 |
| Z | 9.175 |
| Time per step | 3 |

(ii) Measurement of Crystalline Particle Size of (220) Face

An average particle size of crystalline particles of the (220) face, which is a crystal face of the copper layer 110 constituting the copper foils manufactured in Manufacturing Examples 1 to 4 and Comparative Examples 1 to 4, was measured.

The average particle size may be measured or calculated using an XRD method. The average particle size of the crystalline particles may be calculated by applying a half width of an XRD peak value of each crystal face.

(iii) Ratio of Diffraction Intensity of (220) Face

A ratio of diffraction intensity of the (220) face to the sum of diffraction intensities of (111), (200), (220), and (311) faces, which are the crystal faces of the copper layer 110 constituting the copper foils manufactured in Manufacturing Examples 1 to 4 and Comparative Examples 1 to 4, was measured.

First, an XRD graph having peaks corresponding to n crystal faces was obtained at a diffraction angle (2θ) ranging from of 30° to 95° through an XRD method [target: copper K alpha 1, 2θ interval: 0.01°, and 2θ scan speed: 3°/min]. Referring to FIG. 3, an XRD graph, which includes four peaks corresponding to the (111) face, the (200) face, the (220) face, and the (311) face in the copper layer 110, may be obtained. Here, n is four.

Next, XRD diffraction intensity [I(hkl)] of each crystal face (hkl) was obtained from the graph.

The ratio of the diffraction intensity of the (220) face to the sum of the diffraction intensities of the (111), (200), (220), and (311) faces, which are the crystal faces of the copper layer 110, (that is, the ratio of diffraction intensity of (200) face) is calculated according to Equation 1 below.

$$\text{ratio of diffraction intensity of } (hkl) \text{ face} = \quad [\text{Equation 1}]$$
$$100 \times I(hkl)/[I(111) + I(200) + I(220) + I(311)]$$

(iv) Content of Carbon (C)

The copper foil of each of Manufacturing Examples 1 to 4 and Comparative Examples 1 to 4 was cut to manufacture a measurement sample having a size of 2 cm×2 cm, and a content of a carbon (C) component was calculated by measuring the number of atoms from a surface of the sample using PHI700 (manufactured by ULVAC-PHI, INC.), which is a device for AES.

Analysis conditions are as follows.
Electron energy analyzer: CMA
Electron beam energy: 5 KeV
Target current: 10 nA
Tilt: 30 degrees
Sputtering etching rate: 133 Å/min based on $SiO_2$ (3 KV argon ion beam)

(v) Measurement of Elongation after Heat Treatment

After heat treatment of the copper foils manufactured in Manufacturing Examples 1 to 4 and Comparative Examples 1 to 4 at a temperature 130° C. for 30 minutes, elongation of the copper foils was measured.

The elongation was measured using a UTM according to regulations of the IPC-TM-650 test method manual. Specifically, the elongation was measured using a UTM manufactured by Instron company. A width of a sample for measuring elongation was 12.7 mm, a distance between grips was 50 mm, and a test speed was 50 mm/min.

(vi) Difference in Surface Roughness (Ra or Rz JIS) Between First Surface and Second Surface of Copper Foil Surface roughness (Ra or Rz JIS) of each of a first surface S1 and a second surface S2 of the copper foils manufactured in Manufacturing Examples 1 to 4 and Comparative Examples 1 to 4 was measured according to JIS B 0601-2001 standards using a roughness tester (M300 manufactured by Mahr Inc.). A difference (ΔRa or ΔRz JIS) in surface roughness (Ra or Rz JIS) between the first surface S1 and the second surface S2 of the copper foil was calculated using measurement results.

(vii) Measurement of Curling of Copper Foil

The copper foils manufactured in Manufacturing Examples 1 to 4 and Comparative Examples 1 to 4 were cut in a width direction thereof to manufacture a sample having a width of 30 cm (30 cm×30 cm). After the sample was placed on a support such that the first surface S1, which is the direction of a matte surface MS, faces upward, a height from the support was measured. An average value of heights measured at four points of the sample was calculated to obtain a curling value of the copper foil.

(viii) Observation of Occurrences of Wrinkles and Tears

1) Manufacturing of Anode

After 2 parts by weight of styrene butadiene rubber (SBR) and 2 parts by weight of carboxymethyl cellulose (CMC) were mixed into 100 parts by weight of a commercially available silicon/carbon composite anode material for an anode active material, a slurry for an anode active material was prepared using distilled water as a solvent. The slurry for an anode active material was applied to a thickness of 400 μm on the copper foils having a width of 10 cm of Manufacturing Examples 1 to 4 and Comparative Examples 1 to 4 using a doctor blade and dried at a temperature of 120° C., and a pressure of 1 ton/cm² was applied thereon, thereby manufacturing an anode for a secondary battery.

2) Preparation of Electrolyte $LiPF_6$ as a solute was dissolved at a concentration of 1M in a non-aqueous organic solvent in which ethylene carbonate (EC) and ethyl methyl carbonate (EMC) are mixed in a ratio of 1:2, thereby preparing a basic electrolyte. A non-aqueous electrolyte was prepared by mixing 99.5 wt % basic electrolyte and 0.5 wt % succinic anhydride.

3) Manufacturing of Cathode

Lithium manganese oxide ($Li_{1.1}Mn_{1.85}Al_{0.05}O_4$) and lithium manganese oxide (o-$LiMnO_2$) having an orthorhombic crystal structure were mixed in a ratio (weight ratio) of 90:10 to prepare a cathode active material. The cathode active material, carbon black, and poly(vinylidenefluoride) (PVDF) as a binder were mixed in a ratio (weight ratio) of 85:10:5 and mixed with NMP as an organic solvent to prepare a slurry. The prepared slurry was applied on both surfaces of an Al foil having a thickness of 20 μm and dried to manufacture a cathode.

4) Manufacturing of Test Lithium Secondary Battery

In an aluminum can, a cathode and an anode were disposed to be insulated from the aluminum can, and a non-aqueous electrolyte and a separator were disposed therebetween, thereby manufacturing a lithium secondary battery in the form of a coin. The used separator was polypropylene (Celgard 2325 with a thickness of 25 μm, an average pore size of φ28 nm, and a porosity of 40%).

5) Charging/Discharging of Secondary Battery

The lithium secondary battery manufactured as above was driven with a charging voltage of 4.3 V and a discharging voltage of 3.4 V, and charging and discharging were performed 100 times at a high temperature of 50° C. at a current rate (C-rate) of 0.2 C.

6) Occurrence of Wrinkles or Tears

After the charging and discharging were performed 100 times, the secondary battery was disassembled to observe whether wrinkles or tears occurred in the copper foil. A case in which wrinkles or tears occurred was designated as "occurrence," and a case in which wrinkles or tears did not occur was designated as "no."

The above test results are shown in Tables 3 and 4.

a (220) face, a content of carbon (C), and elongation after heat treatment were less than or equal to reference values, a difference in surface roughness between a first surface and a second surface was also great, and wrinkles, curling, and tears occurred.

In the copper foil of Comparative Example 3 manufactured using an electrolyte including arsenic (As) ions in an excessive amount, residual stress was high, and a size of crystalline particles was smaller than the reference value. In addition, a ratio of diffraction intensity of a (220) face and a content of carbon (C) were less than or equal to the

TABLE 3

| Classification | Residual stress (Mpa) | | | | Crystalline particle size of (220) face | Ratio of diffraction intensity of (220) face (%) | Content of carbon (C) |
| --- | --- | --- | --- | --- | --- | --- | --- |
| | (111) face | (200) face | (220) face | (311) face | | | |
| Manufacturing Example 1 | 2.3 | 2.4 | 2.4 | 2.2 | 86 | 15.4 | 8.7 |
| Manufacturing Example 2 | 14.2 | 15.7 | 16.1 | 15.1 | 75 | 11.9 | 11.9 |
| Manufacturing Example 3 | 7.3 | 8.9 | 7.9 | 8.2 | 93 | 22.2 | 18.1 |
| Manufacturing Example 4 | 28.1 | 23.5 | 22.5 | 24.3 | 91 | 19.3 | 10.3 |
| Comparative Example 1 | 34.1 | 16.6 | 17.6 | 17.2 | 57 | 17.2 | 10.4 |
| Comparative Example 2 | 35.1 | 28.8 | 29.9 | 31.1 | 46 | 0.5 | 0.9 |
| Comparative Example 3 | 37.5 | 28.2 | 27.1 | 27.2 | 44 | 8.8 | 1.8 |
| Comparative Example 4 | −7.7 | −8.1 | −7.9 | −8.3 | 115 | 35.9 | 18.9 |

TABLE 4

| Classification | Elongation after heat treatment | First surface Ra or Rz (μm) | Second surface Ra or Rz (μm) | ΔRz JIS (μm) | Curling (mm) | Wrinkle | Tear |
| --- | --- | --- | --- | --- | --- | --- | --- |
| Manufacturing Example 1 | 4.2 | 1.12 | 1.09 | 0.03 | 11 | no | no |
| Manufacturing Example 2 | 5.4 | 1.23 | 1.15 | 0.08 | 13 | no | no |
| Manufacturing Example 3 | 6.2 | 0.89 | 0.85 | 0.04 | 9 | no | no |
| Manufacturing Example 4 | 5.1 | 1.10 | 0.98 | 0.12 | 11 | no | no |
| Comparative Example 1 | 3.9 | 1.19 | 0.88 | 0.31 | 19 | no | occurrence |
| Comparative Example 2 | 1.9 | 2.54 | 3.06 | 0.52 | curl | occurrence | occurrence |
| Comparative Example 3 | 2.2 | 2.19 | 1.51 | 0.68 | curl | no | occurrence |
| Comparative Example 4 | 4.1 | 0.91 | 0.94 | 0.03 | 3 | occurrence | occurrence |

The following results can be confirmed with reference to Tables 1, 3, and 4. In the copper foil of Comparative Example 1 manufactured using an electrolyte including arsenic (As) ions and a leveling agent (component C) in an excessive amount, a (111) face had high residual stress, a size of crystalline particles was smaller than a reference value, and curling and tears occurred.

In the copper foil of Comparative Example 2 manufactured using an electrolyte including a polishing agent (component A) in an excessive amount, residual stress was high, and a size of crystalline particles was smaller than the reference value. In addition, a ratio of diffraction intensity of reference values, a difference in surface roughness between a first surface and a second surface was also great, and curling and tears occurred.

In the copper foil of Comparative Example 4 manufactured using an electrolyte including arsenic (As) ions and chlorine (Cl) in an excessive amount, residual stress was low, and wrinkles and tears occurred.

On the other hand, in the copper foil of Manufacturing Examples 1 to 4 according to the present disclosure, curling of 20 mm or less occurred, and wrinkles and tears did not occur.

It will be apparent to those skilled in the art that the present disclosure described above is not limited by the above-described embodiments and the accompanying drawings and that various substitutions, modifications, and variations can be made in the present disclosure without departing from the spirit and scope of the present disclosure. Consequently, the scope of the present disclosure is defined by the accompanying claims, and it is intended that all variations and modifications derived from the meaning, scope, and equivalent concept of the claims fall within the scope of the present disclosure.

DESCRIPTIONS OF REFERENCE NUMERALS

101, 102: copper foil
211, 212: anticorrosive film
310, 320: active material layer
103, 104: electrode for secondary battery
MS: matte surface
SS: shiny surface

The invention claimed is:

1. A copper foil comprising:
a copper layer having a matte surface and a shiny surface; and
an anticorrosive film disposed on the copper layer,
wherein the copper foil has a residual stress of 0.5 MPa to 25 Mpa based on an absolute value,
the copper layer includes copper and carbon (C),
in the copper layer, a content of the carbon (C) is in a range of 2 ppm to 20 ppm,
the copper layer has a (111) face, a (200) face, a (220) face, and a (311) face including crystalline particles,
a ratio of diffraction intensity of the (220) face to the sum of diffraction intensities of the (111) face, the (200) face, the (220) face, and the (311) face is in a range of 10% to 40%,
the crystalline particles on the (220) face have an average particle size of 70 nm to 120 nm at room temperature, and
wherein the residual stress is measured using X-ray diffraction (XRD) at room temperature.

2. The copper foil of claim 1, wherein the residual stress is measured on at least one of the (111) face, the (200) face, the (220) face, and the (311) face.

3. The copper foil of claim 1, wherein the residual stress is measured on the (200) face.

4. The copper foil of claim 1, wherein the copper foil has an elongation of 2% to 20% after being heat-treated at a temperature of 130° C. for 30 minutes.

5. The copper foil of claim 1, wherein the copper foil has a first surface in a direction of the matte surface and a second surface in a direction of the shiny surface, and
a difference in arithmetic mean roughness (Ra) between the first surface and the second surface is 0.5 μm or less.

6. The copper foil of claim 1, wherein the copper foil has a first surface in a direction of the matte surface and a second surface in a direction of the shiny surface, and
a difference in ten-point mean roughness (Rz JIS) between the first surface and the second surface is 0.5 μm or less.

7. The copper foil of claim 1, wherein the copper foil has a thickness of 2 μm to 20 μm.

8. The copper foil of claim 1, wherein the anticorrosive film includes at least one selected from among chromium, a silane compound, and a nitrogen compound.

9. An electrode for a secondary battery, comprising:
a copper foil; and
an active material layer disposed on at least one surface of the copper foil,
wherein the copper foil is the copper foil of claim 1.

10. A secondary battery comprising:
a cathode;
an anode disposed opposite to the cathode;
an electrolyte which provides an environment in which lithium ions are movable between the cathode and the anode; and
a separator configured to electrically insulate the cathode from the anode,
wherein the anode includes:
the copper foil of claim 1; and
an active material layer disposed on the copper foil.

* * * * *